United States Patent [19]

Levy et al.

[11] 3,911,400

[45] Oct. 7, 1975

[54] DRIVE CONDITION DETECTING CIRCUIT FOR SECONDARY STORAGE FACILITIES IN DATA PROCESSING SYSTEMS

[75] Inventors: John V. Levy, Maynard; Stephen R. Jenkins, Medford; Victor Ku, Westboro; Peter McLean, Stow; Thomas N. Hastings, Arlington, all of Mass.

[73] Assignee: Digital Equipment Corporation, Maynard, Mass.

[22] Filed: Apr. 19, 1974

[21] Appl. No.: 462,361

[52] U.S. Cl. .............................................. 340/172.5

[51] Int. Cl.[2] .......................................... G06F 13/00

[58] Field of Search .............. 340/172.5; 235/153 R

[56] References Cited

UNITED STATES PATENTS

| | | | |
|---|---|---|---|
| 3,560,935 | 2/1971 | Beers | 340/172.5 |
| 3,566,363 | 2/1971 | Driscoll, Jr. | 340/172.5 |
| 3,699,532 | 10/1972 | Schaffer et al. | 340/172.5 |
| 3,710,324 | 1/1973 | Cohen et al. | 340/172.5 |
| 3,820,085 | 6/1974 | Zelinski | 340/172.5 |
| 3,824,563 | 7/1974 | Lutz | 340/172.5 |
| 3,840,864 | 10/1974 | Chang et al. | 340/172.5 |

*Primary Examiner*—Charles E. Atkinson

*Attorney, Agent, or Firm*—Caesari and McKenna

[57] ABSTRACT

A drive condition detecting circuit for a secondary storage facility in a data processing system including magnetic tape, disk or drum units or other sequential access storage units. Each storage unit or drive contains a flip-flop which can be set by the appearance of any one of several condition signals indicating error conditions or the need for interaction with another part of the system. The flip-flop transmits a signal which causes a controller to interrupt the system. Then the status of all the flip-flops in all drives can be determined in one operation to avoid polling. The flip-flop is reset during a system initialization, in response to a new transfer command or in response to a specific command for clearing the specific flip-flop.

13 Claims, 17 Drawing Figures

DRIVE CONDITION DETECTING CIRCUIT FOR SECONDARY STORAGE FACILITIES IN DATA PROCESSING SYSTEMS

BACKGROUND OF THE INVENTION

This invention generally relates to data processing systems and more specifically to drive condition detection circuits in secondary storage facilities connected in such systems.

Secondary storage facilities comprise elements which are not an integral part of a central processing unit and its random access memory element, but which are directly connected to and controlled by the central processing unit or other elements in the system. These facilities are also known as "mass storage" elements and include magnetic tape memory units, disk units and drum units.

These facilities are also termed "sequential access storage units" because the information stored on one of these units becomes available, or is stored, only in a "one-after-the-other" sequence, whether or not all the information or only some of it is desired. For example, it is usual practice to retrieve information from a disk unit on a "sector-by-sector" basis, even though only one of several information records in a sector is needed. Similarly, a physical record on a tape is analogous to a sector on a disk and a complete physical record may be retrieved even though it may contain more than one relevant information record.

These devices are also "serial storage devices". In a serial storage device time and sequential position are factors used to locate any given bit, character, word or groups of words appearing one after the other in time sequence. The individual bits appear or are read serially in time.

In modern data processing systems a secondary storage facility includes a controller and one or more drives connected thereto. The controller operates in response to signals from the data processing system, usually on an input/output bus which connects other elements in the system, including the central processing unit, together. A drive contains the recording medium (e.g., tape or a rotating disk), the mechanism for moving the medium, and electronic circuitry to read data from or store data on the medium and also to convert the data between serial and parallel formats.

The controller appears to the rest of the system as any other system element on the input/output bus. It receives commands over the bus which include command information about the operation to be performed, the drive to be used, the size of the transfer, the starting address on the drive for the transfer, and the starting address in some other system element, such as a random access memory unit. The controller converts all this command information into the necessary signals to effect the transfer between the appropriate drive and other system elements. During the transfer itself, the controller routes the data to or from the appropriate drive and from or to the input/output bus or a memory bus.

There are several schemes for interconnecting a controller and two or more drives. Two popular schemes are known as "radial" and "daisy-chain" connections. In a radial connection, the controller has circuits for accepting a separate and independent bus or cable from each drive. Circuits in the controller perform all the addressing and selection functions. A controller used in a radial interconnection must contain some duplication of circuits, as certain circuits must be included for each possible drive connection. These circuits are present whether or not all possible drive connections are used. For this, and other reasons, the radial configuration has been limited to use in large, expensive systems where most, if not all, drive connections in a controller are utilized.

In the daisy-chain connection, all the drives connect to a single bus. The controller has only one set of circuits for interacting with the bus, so the circuit duplications found in controllers for use in the radial connection are not present in the daisy-chain connection. Circuits in the drives themselves perform the addressing and selection functions. As a controller contains only the circuits necessary to operate one drive, a system may contain fewer than the maximum number of drives without introducing any unnecessary expense. Thus, controllers and drives in daisy-chain configurations are popular in smaller or less expensive systems where even the cost of a bus can become a significant portion of the total system cost.

Regardless of the nature of the interconnection between a controller and associated drives, a drive usually has some means for detecting conditions which require intervention by other units in the data processing system, such as the central processing unit. Some conditions are proper operating conditions. For example, it is desirable to know when a drive has its power supply properly energized and, in the case of a magnetic disk drive, its recording medium operating at a proper rotational speed. Other conditions are malfunctions and are termed "error" conditions, such as the loss of power at a drive or the occurrence of a timing fault during a transfer of data.

In a system using a radial connection, a single error signal can be transmitted by the drive indicating that some one of these detected conditions has been monitored. As each drive has its own connection to the controller, circuits in the controller can easily identify the drive. This is not true in a daisy-chain connection, however. In prior secondary storage facilities, one error signal is received in the controller, but it can not identify a specific drive. It is necessary for the central processing unit to process an interruption routine which performs a polling function to identify the drive that initiated the signal. Even though only the first drive to be polled may be the only drive involved, all drives must be polled to assure that two or more drives have not transmitted error signals simultaneously. All these operations require a significant period of time which can reduce system efficiency.

Still other operations which tend to reduce efficiency occur when the error signals are to be terminated. It is usually necessary to correct the errors and then terminate the error signal on a drive-by-drive basis or to correct the errors on a drive-by-drive basis and then terminate the error signal in all drives simultaneously. In either approach, certain time delays can be introduced.

The foregoing problems are inherent in prior daisy-chain connections, but not in radial connections. However, they have been tolerated because the advantages of radial connections would not offset the added costs in many data processing systems.

Therefore, it is an object of this invention to provide a drive condition detecting circuit which is compatible with drives and controllers in both radial and daisy-chain connections.

Another object of this invention is to provide a drive condition detecting circuit which eliminates the need for polling operations.

Still another object of this invention is to provide a drive condition detecting circuit which can be reset in a number of ways to provide more flexibility.

Yet another object of this invention is to provide a drive condition detecting circuit which can be reset without changing the status of any condition in the drive.

SUMMARY

In accordance with this invention an asynchronous drive control path including data, address and control lines transfers signals which perform control functions. Each drive transmits an attention signal over the asynchronous control lines in response to the existence of error or other pertinent condition in the drive. The controller interrupts another unit in the data processing system, such as the central processing unit, and then receives a command to monitor the condition of the transmitters in all drives. Each drive responds simultaneously by coupling the attention signal onto a single asynchronous data line reserved for that drive, so the pattern of signals on the data lines identifies all drives then transmitting attention signals. This eliminates polling operations.

The attention signal is transmitted separately, so it can be terminated in each drive without disturbing signals indicating the conditions which first caused the attention signal to be transmitted. Further, the attention signal may be terminated in response to a system clearing operation, in response to the receipt by the drive of a transfer command, or in response to a command for terminating a specific one or a group of attention signals.

This invention is pointed out with particularity in the appended claims. The above and further objects and advantages of this invention may be attained by referring to the following description taken in conjunction with the accompanying drawings.

DESCRIPTION OF ILLUSTRATIVE EMBODIMENTS

I. General Description

Figure 1:
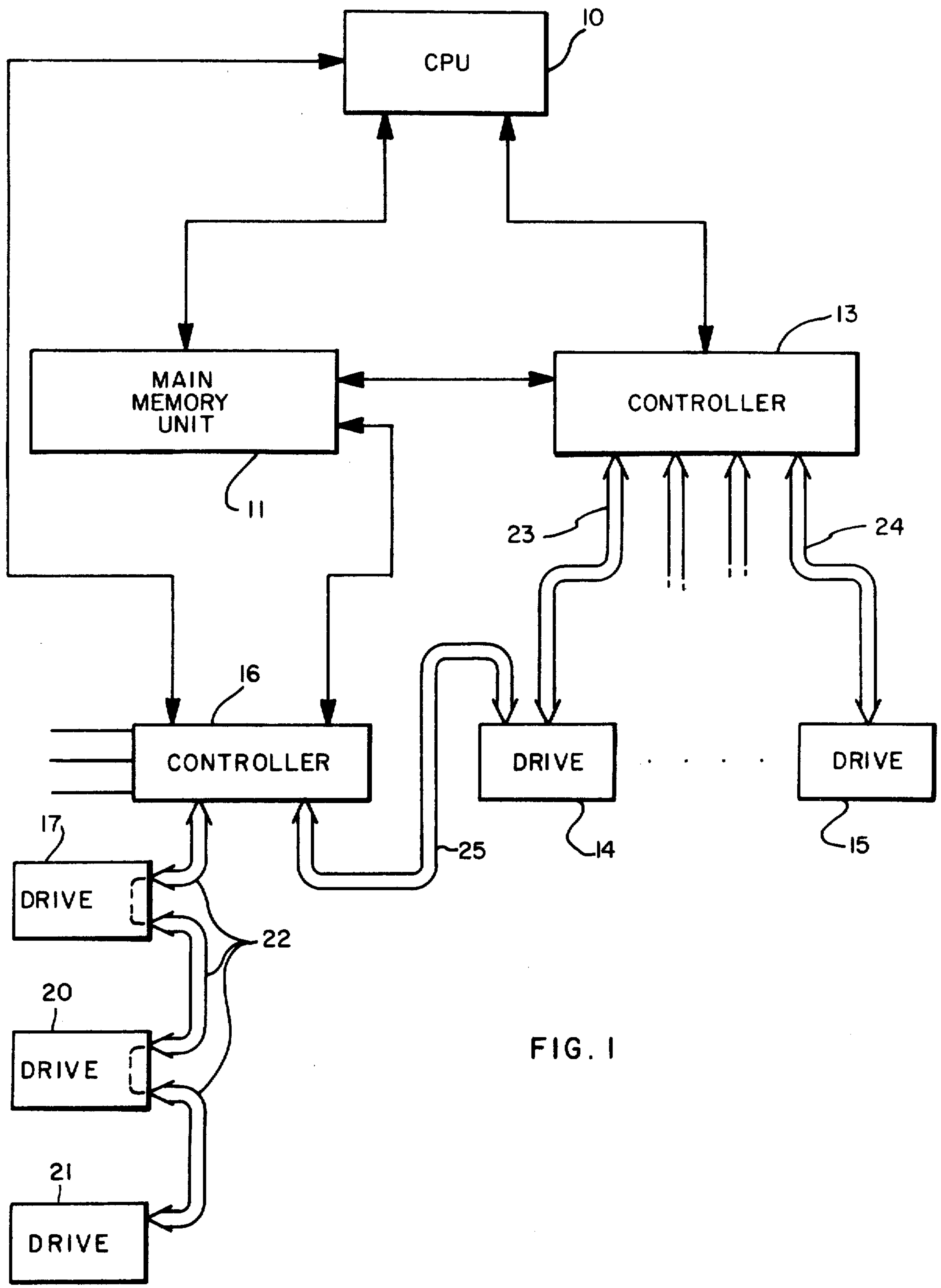
FIG. 1 is a generalized block diagram of a data processing system adapted to use this invention.

FIG. 1 depicts the general organization of a data processing system comprising a central processing unit (CPU) 10 and a main memory unit 11, normally a random access memory unit. Information also may be transferred to or from a secondary storage facility including a controller 13 and several drives, drives 14 and 15 being shown by way of example. Another such storage facility includes a controller 16 and drives 17, 20 and 21. This facility is also coupled to the central processing unit 10 and the main memory unit 11.

As previously indicated, a drive includes a recording medium and the mechanical and electrical components for recording data on or reading from the recording medium in the context of this invention. For example, it can comprise a fixed or movable head disk memory unit, a megnetic drum memory unit or a magnetic tape unit, as well as non-mechanically driven memory units. Timing signals derived from the medium normally synchronize data transfers with movement of the medium. A typical drive contains control, status, error and other registers for controlling and monitoring drive operations.

A controller 13 or 16 may be located physically separately from the central processing unit 10 as shown in FIG. 1 or may be an integral part of a central processing unit. Controllers serve as interfaces between the central processing unit and the drive. They contain the circuits for exchanging data with either the central processing unit 10 or the main memory unit 11. Buffer registers in the controller 13 or 16 compensate for the usually different transfer rates between the controller and main memory unit 11, on the one hand, and between the controller and drive, on the other hand.

Drives are connected to controllers by means of device buses in several different configurations. If, for example, the controller 16 were connected to drive 17 only, the arrangement would be termed a single drive configuration. Actually, as shown in FIG. 1, the drives 17, 20 and 21 are interconnected by a device bus 22 which is threaded from one drive to the next. This is an example of the previously discussed daisy-chain configuration. Device buses 23 and 24 connect drives 14 and 15, respectively, in the radial configuration. Drive 14 is linked to the controller 16 by way of a device bus 25;

the drive 14 is thus in a dual controller-single drive configuration.

It will become apparent from the following discussion that this invention is adapted for all these configurations. The user of a system will determine his own specific configuration. It also will become apparent that if drive 14 is one type of magnetic disk memory unit, drive 15 can be another unit of the same type, a magnetic disk memory unit of another type, or even a magnetic tape or magnetic drum unit or other type of sequential access memory. Moreover, drives 17, 20 and 21 could be directly connected to controller 13 without any modification to either the controller 13 or any of the drives.

Figure 2:
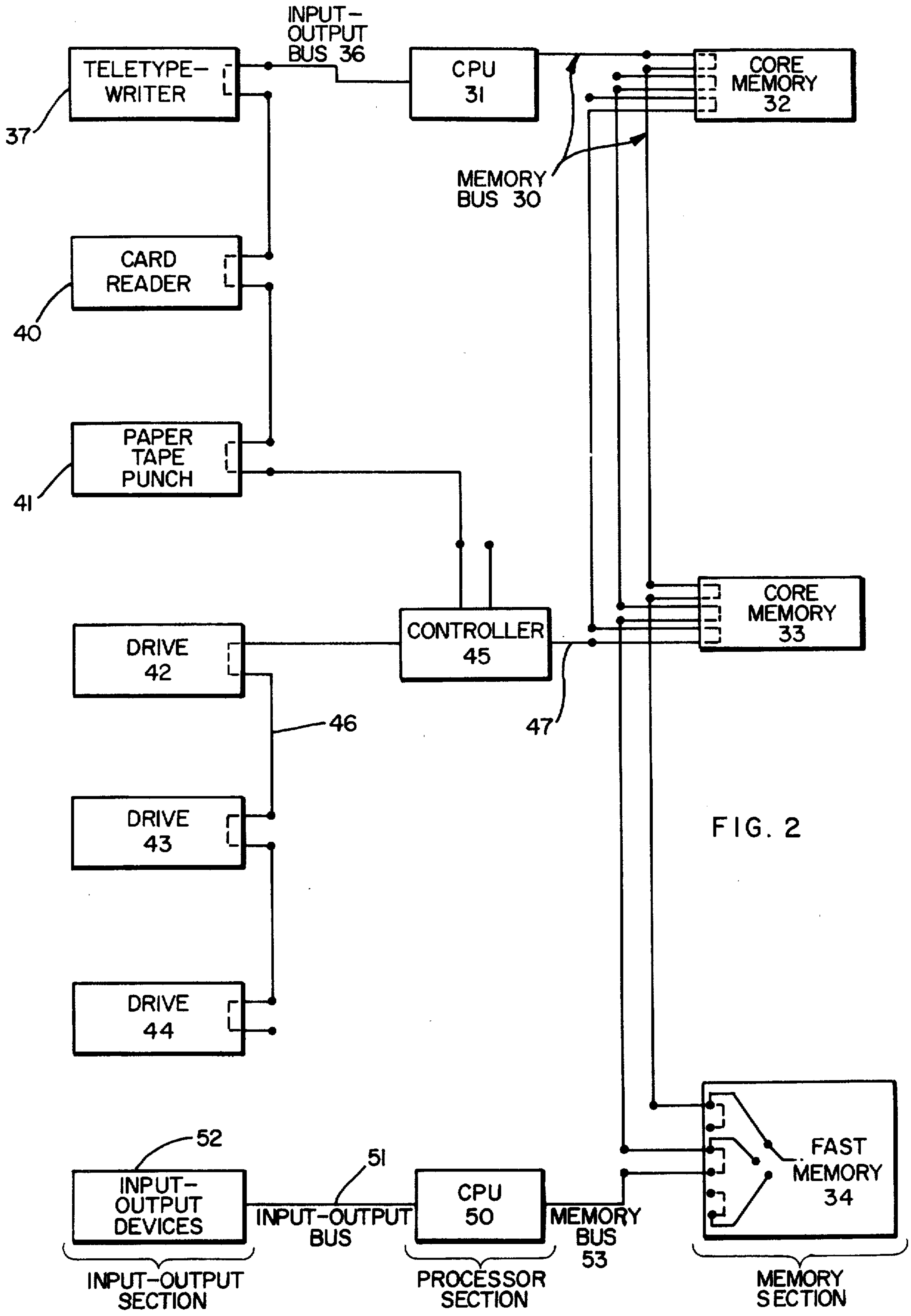
FIG. 2 is a block diagram of one type of data processing system shown in FIG. 1 in which separate memory and input/output buses link elements in the systems.
Figure 3:
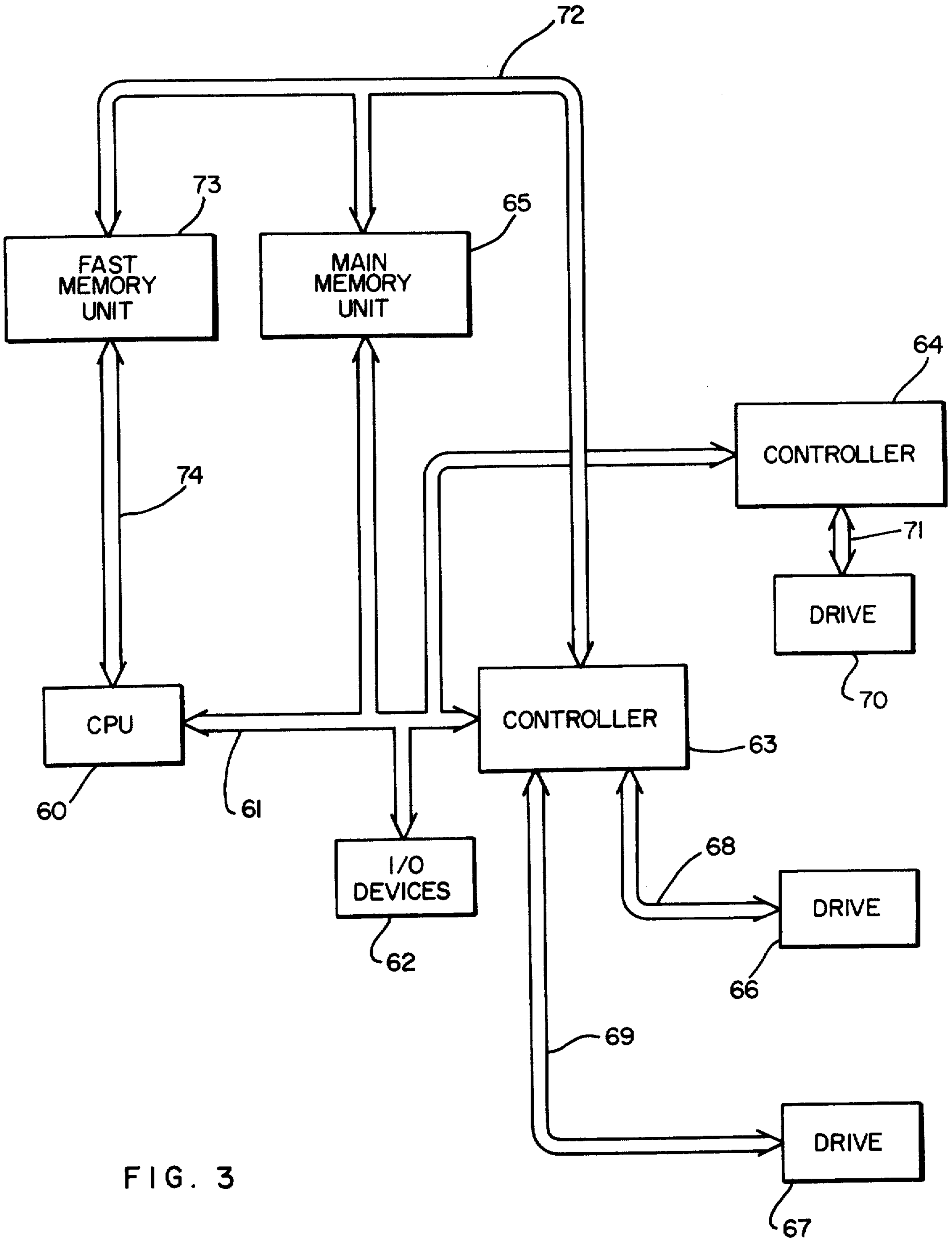
FIG. 3 is a block diagram of another type of data processing system shown in FIG. 1 in which a single bus is common to all elements in the system.

This interchangeability and resultant flexibility result because each of the device buses 22, 23, 24 and 25 contains a standard set of corresponding conductors for transferring signals, nowithstanding the drive connected to the device bus or the data processing system which is involved. As new drives are developed with improved storage media such as tapes and disks with higher recording density or even of new media, it will only be necessary to have the drive itself conform to the standard set of signals, no new controller development will be necessary New drives will also be independent of the type of data processing systems to which they connect. FIGS. 2 and 3 depict diverse types of data processing systems. The nature of the data processing system has no effect on the drive itself. Although these two data processing systems form no part of the invention, the fact that they are diverse of systems emphasizes the flexibility that this invention provides to secondary storage facilities. Also, specific examples of data processing systems will facilitate an understanding of the detailed discussion of this invention.

FIG. 2 illustrates a data processing system containing two separate data paths. The system is also segregated into input-output, processor and memory sections. A memory bus 30 connects a first central processing unit (CPU) 31 with a memory section including, for example, a core memory 32, a core memory 33 and a fast or volatile memory 34. An input-output bus 36 connects the central processing unit 31 with several input-output devices such as a teletypewriter 37, a card reader 40, and a paper tape punch 41. The memory bus 30 and the input-output bus 36 carry control, address and data signals in two directions. The signals on each bus are transferred in parallel, as distinguished form serial transmission.

The central processing unit 31 can also control the transfer of data between the memory section and a secondary storage facility. In FIG. 2 this storage facility comprises drives 42, 43 and 44 connected to a controller 45 by a device bus 46 in a daisy-chain configuration. In accordance with this invention, the controller 45 receives control information over the input-output bus 36 to be processed by an asynchronous drive control path within the controller 45. A synchronous data path in the controller may transfer data to the memory bus 30 or, as shown, to a second memory bus 47. Thus, transfers between the secondary storage facility and the memory section occur only with minimum use of the input-output bus 36 and the central processing unit 31 because data can be transferred directly through the controller 45 to the memory section. As also shown in FIG. 2 a second central processing unit 50 connects through an input-output bus 51 to other input-output devices 52. The central processing unit 50 also connects to the memory section through a bus 53, which enables the unit 50 to use the memory units 32, 33 and 34 in common with the processing unit 31 including data supplied to the memory section by the secondary storage facility.

As previously stated, this is an example of a data processing system which has separate input-output and memory buses. In operation, the central processing unit 31 might require some program stored in the drive 42. A second program already contained in the memory section would contain the necessary instructions to transfer a command to the controller 45 over the bus 36 to identify a particular drive, such as the drive 42, the starting location in the drive (e.g., the track and sector numbers in a disk memory unit) and other necessary information, as known in the art. Once the controller 45 receives that information, it retrieves data from the drive 42 and then transfers to the memory bus 47 directly for storage and subsequent use by the central processing unit 31 or even the central processing unit 50. Analagous transfers occur in a system using a common bus to interconnect the system elements. Such a system is shown in FIG. 3 and comprises a central processing unit (CPU) 60 and a first common bus 61. The bus 61 contains address, data and control conductors. It connects the central processing unit 60 in parallel with input-output devices 62 and controllers 63 and 64 associated with two secondary storage facilities.

The system in FIG. 3 includes a main memory unit 65 connected to the bus 61. Data transfers can occur over the bus 61 between the main memory unit 65 and any of the drives 66 and 67 connected to the controller 63 in a radial configuration by device buses 68 and 69, respectively, or a drive 70 connected in a single drive configuration to controller 64 by a device bus 71. These transfers occur over the bus 61 without requiring the CPU 60 to perform an interruption routine.

The controller 63 has an additional connection for another bus 72 which is identical to the bus 61. The bus 72 is coupled to a second part of the main memory 65, which is a dual-port memory. This bus 72 also connects to a fast memory 73, which is coupled to the central processing unit 60 through dedicated bus 74.

With this data processing system, the central processing unit 60 can transfer a command to the controller 63 over the bus 61. The controller 63 then prepares a drive, such as the drive 66 for an operation by transferring control information over the drive control path in the device bus 68. Data can then pass over the synchronous data path in the device bus 68 through the controller 63 and then either onto the bus 61 or, for more efficient operation, over the bus 72 directly into the memory 65 of 73. If the transfer is being made to another one of the input-output devices 62, the data may pass over the bus 61.

The signals over each of the device buses 46 in FIG. 2 and 68, 69 and 71 in FIG. 3 are the same. This means that the controllers 45, 63 and 64 have the same circuitry at their respective device bus connections. The only required differences between the controllers are those necessary for connection to the data processing system buses.

As the drives are connected only to device buses and all device buses are the same, the drive circuits are independent of any particular system. Of course, different data processing systems have different word sizes which can range from 8 bits to 36 bits or more. Circuit modifications in the controllers or the drives can be made to accomodate these different word sizes. At this point it is sufficient to consider the use of a basic 18 bit word. No modification is necessary for a central processing unit using 18 bit words. To provide a 36 bit word for other data processing systems the controller merely needs to concatenate pairs of 18 bit words. Other arrangements can be used when the data processing system word length is not an exact multiple of a drive word length.

II. The Device Bus

Figure 4:
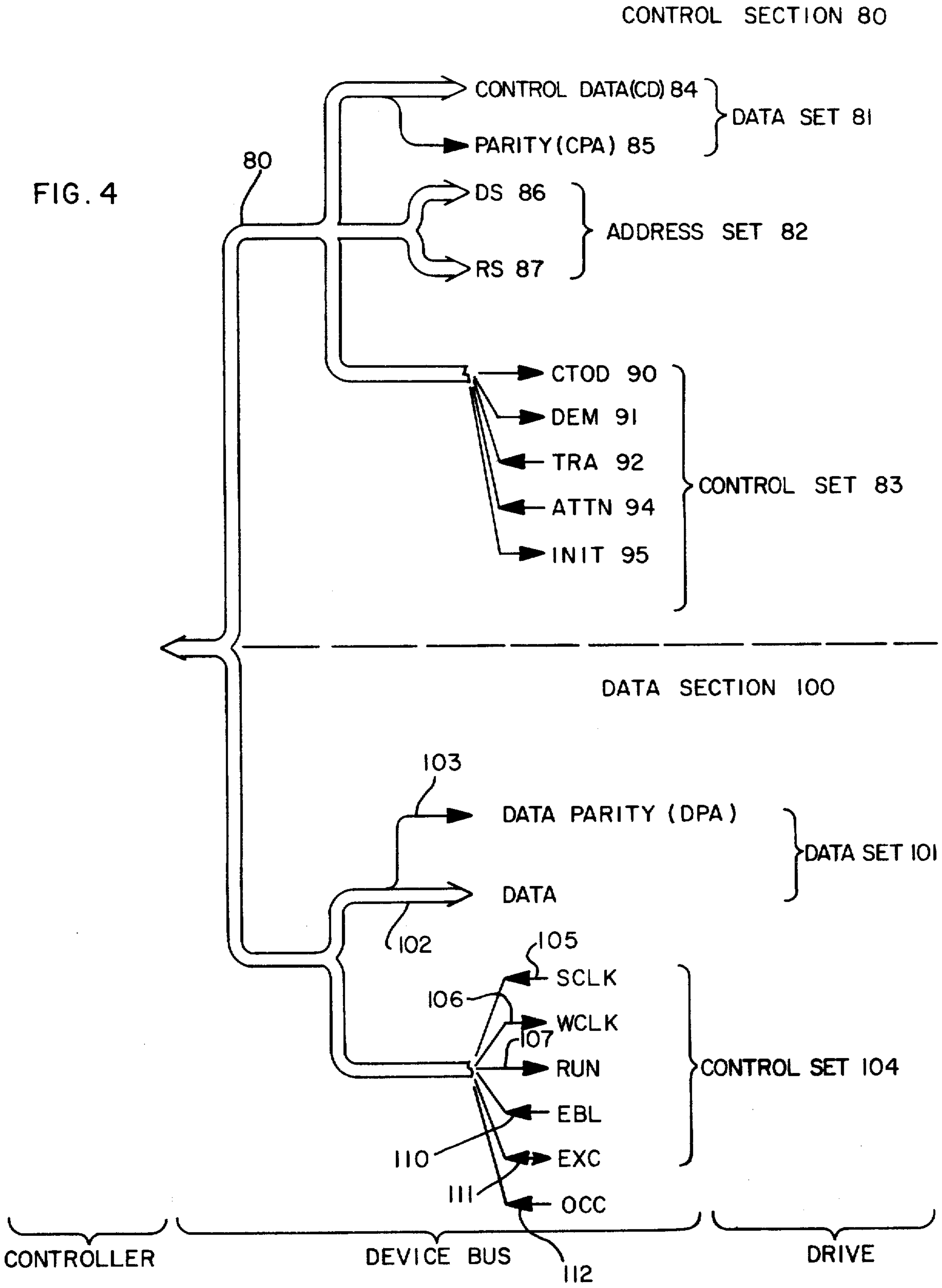
FIG. 4 depicts an interconnecting bus between a drive and controller in accordance with this invention.

To understand the interaction between a controller and device it is helpful to discuss the specific signals which appear on the device bus and the functions each performs. A device bus, with the signal designations, is shown in FIG. 4; and the same mnemonic identifies a wire or group of wires and the signals they carry. Every device bus has the same constructions. A drive control section 80 contains conductors segregated into a data set 81, an address set 82 and a control set 83. Within the data set 81 there are bidirectional control data (CD) wires 84 and a bidirectional control data parity (CPA) wire 85 for carrying control and status information between a controller and any of its respective drives. A bidirectional CPA wire 85 carries a parity bit. The control information includes commands which control information includes commands which control the operation of the drive. Some of the commands initiate data transfer and include READ, WRITE and WRITE CHECK commands. Other commands initiate control operations such as positioning heads in a moveable head disk drive, winding a tape in a magnetic tape drive or clearing registers in a drive.

Within the address set 82, there are drive selection (DS) wires 86 and register selection (RS) wires 87. The DS wires 86 carry DS signals from a controller to provide information for selecting a drive for an ensuing transfer of control or status information. A controller also transmits the RS signals. Within the drive identified by the DS signals, the RS signals define a specific register which is to be involved in a transfer.

The control set 83 includes a controller-to-drive transfer (CTOD) wire 90. When a controller asserts a CTOD signal (i.e., a logic ONE signal level), the following transfer over the data set 81 is from the controller to the selected register in the selected drive. When the CTOD signal is not asserted, (i.e., is at a logic ZERO signal level), the transfer is from the selected drive register to the controller.

A demand (DEM) wire 91 and a transfer (TRA) wire 92 carry asynchronous timing signals. Specifically, the controller puts a DEM signal onto the wire 91 to initiate a transfer of control information. The selected drive transmits the TRA signal to indicate the receipt of control information or the availability of status information.

In accordance with this invention, a drive transmits an ATTN signal onto a single ATTN wire 94, which is common to all drives, whenever it requires some interaction with the controller and the central processing unit 60. Usually the controller responds by interrupting the data processing system.

An INIT signal on a wire 95 services as a facility resetting signal. Upon receipt of the INIT signal, a drive immediately terminates its operation,, clears all error conditions and becomes available to the controller and system for further operations.

A synchronous data section 100 shown in FIG. 4 carries blocks of data at high transmission speeds between the controller and drives. These blocks of data are carried in response to READ, WRITE and WRITE-CHECK commands previously sent to a controller and its respective drive with related transfers occuring over the control section 80. The data section 100 also serves as a link for control signals which initiate and terminate the block transmissions. Bidirectionally conducting wires in a data set 101 comprise data wires 102 for carrying the data itself and a data parity (DPA) wire 103. A control set 104 includes a SCLK wire 105 and a WCLK wire 106. The drive uses timing signals derived from the recording medium to produce SCLK signals on the SCLK wire 105 to synchronize the reading of data from the data wires 102 and DPA wire 103 when the data moves to the controller. When the data is to be stored in the drive, the controller receives SCLK signals and transmits WCLK signals back to the drive. The WCLK signals control the writing of data onto the recording medium in the device.

A RUN signal controls the initiation of a data transfer and the overall duration of the transfer; it appears on a RUN wire 107. The controller asserts the RUN signal to start a data transfer in accordance with a command which was previously transferred to the drive over the drive control section 80. Subsequently, circuits in the drive use the RUN signal to determine the time for terminating the transfer. AN EBL signal transmitted by the drive on a wire 110 signals the end of a block. Any transfer terminates if, at the end of an EBL signal, the RUN signal is not asserted. Otherwise, the transfer operation continues through the next block. In this connection the term block has a conventional meaning as applied to magnetic tape memory units and is equivalent to a sector as that term is conventionally applied to magnetic disk memory units. Thus, in this description, block is used in a generic sense to indicate a conveniently sized group of data bits to be sent as a unit.

A wire 111 in the synchronous data section 100 is a bidirectional wire for carrying exception (EXC) signals. When the drive transmits the EXC signal, some error has occurred during the transmission. This signal remains asserted until the last EBL signal during the transfer terminates. An EXC signal from a controller, on the other hand, causes the drive to terminate any action it was performing in response to a command.

There is also an occupied (OCC) wire 112. Whenever a drive,begins to perform a data transfer over the synchronous section 100, the drive transmits an OCC signal to a controller. This positively indicates that a drive connected to that controller is busy with a data transfer.

Figure 5:
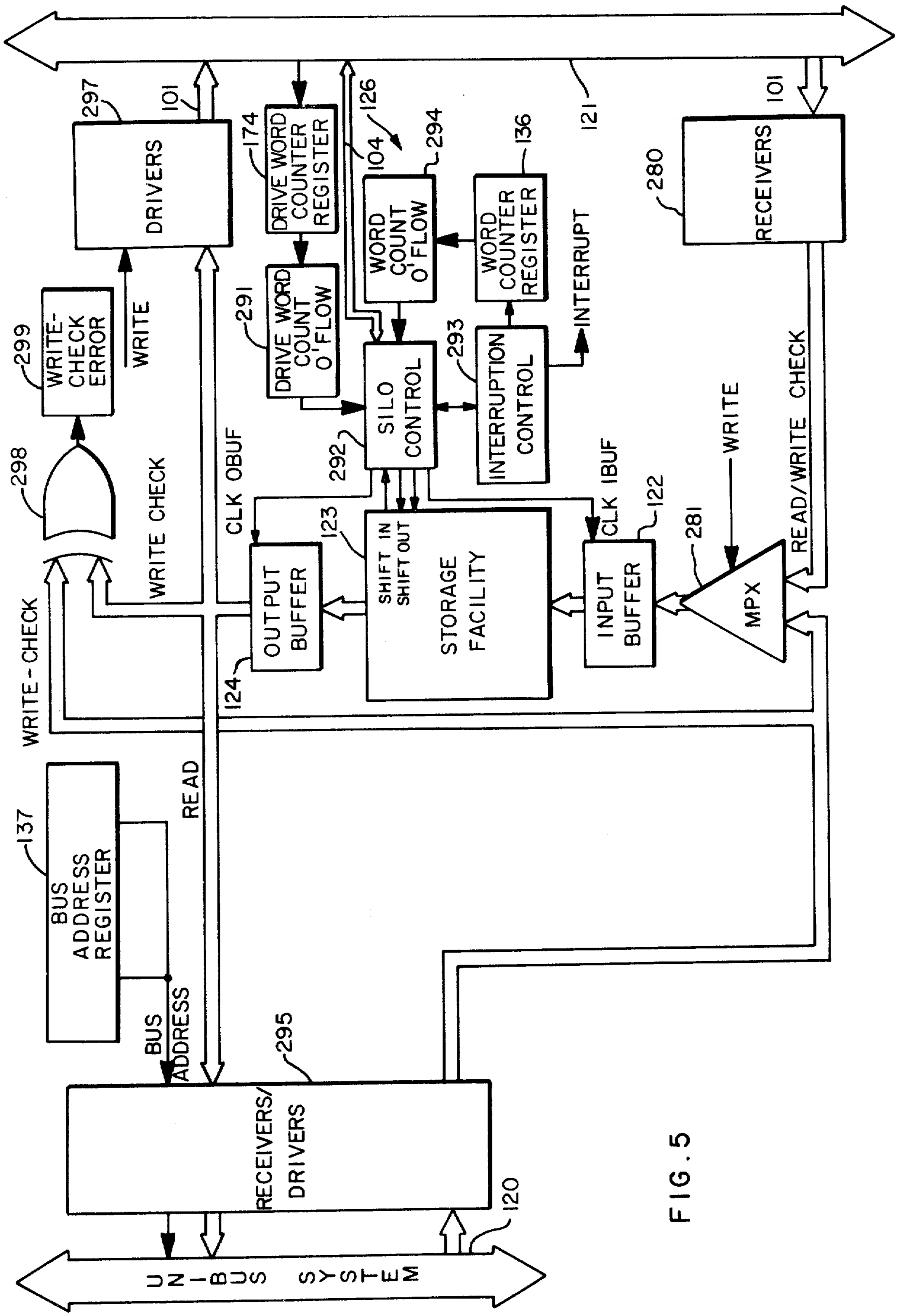
FIG. 5 is a block diagram of a synchronous data path in the controller as adapted for connection to a system as shown in FIGS. 2 or 3.

With this understanding of the signals which appear on a drvice bus, it is possible to discuss generally the circuits in a controller. Looking first at the synchronous data path in FIG. 5, it will be apparent that only one drive connected to a controller may respond to a READ, WRITE or WRITE-CHECK command at any given time because the data section 100 (FIG. 4) is connected to all the drives a controller supervises. Data transfers pass between a system bus 120 and a device bus 121. The system bus might be the memory bus 30 in FIG. 2 or either of the buses 61 or 72 in FIG. 3. Reference numerals used to designate wires in FIG. 4 are applied to corresponding wires in FIGS. 5 through 7 as all device buses are the same.

Incoming data from either a system bus 120 in response to a WRITE command or the data section 101 of a device bus 121 in response to a READ or WRITE-CHECK command is loaded into an input buffer 122 for transfer into a storage facility 123. When the facility 123 is filled, the first word in is loaded into an output buffer 124. A data path control circuit, generally 126, then either effects a transfer onto the device bus 121 for transfer to the device or a transfer onto the system bus 120 for transfer to a designated location in the data processing system. The controller also contains the necessary circuits for generating the appropriate address signals to identify a memory location which either stores the data to be transferred to the controller or which is to receive the data from the drive.

III. Drive Control Path

Figure 6:
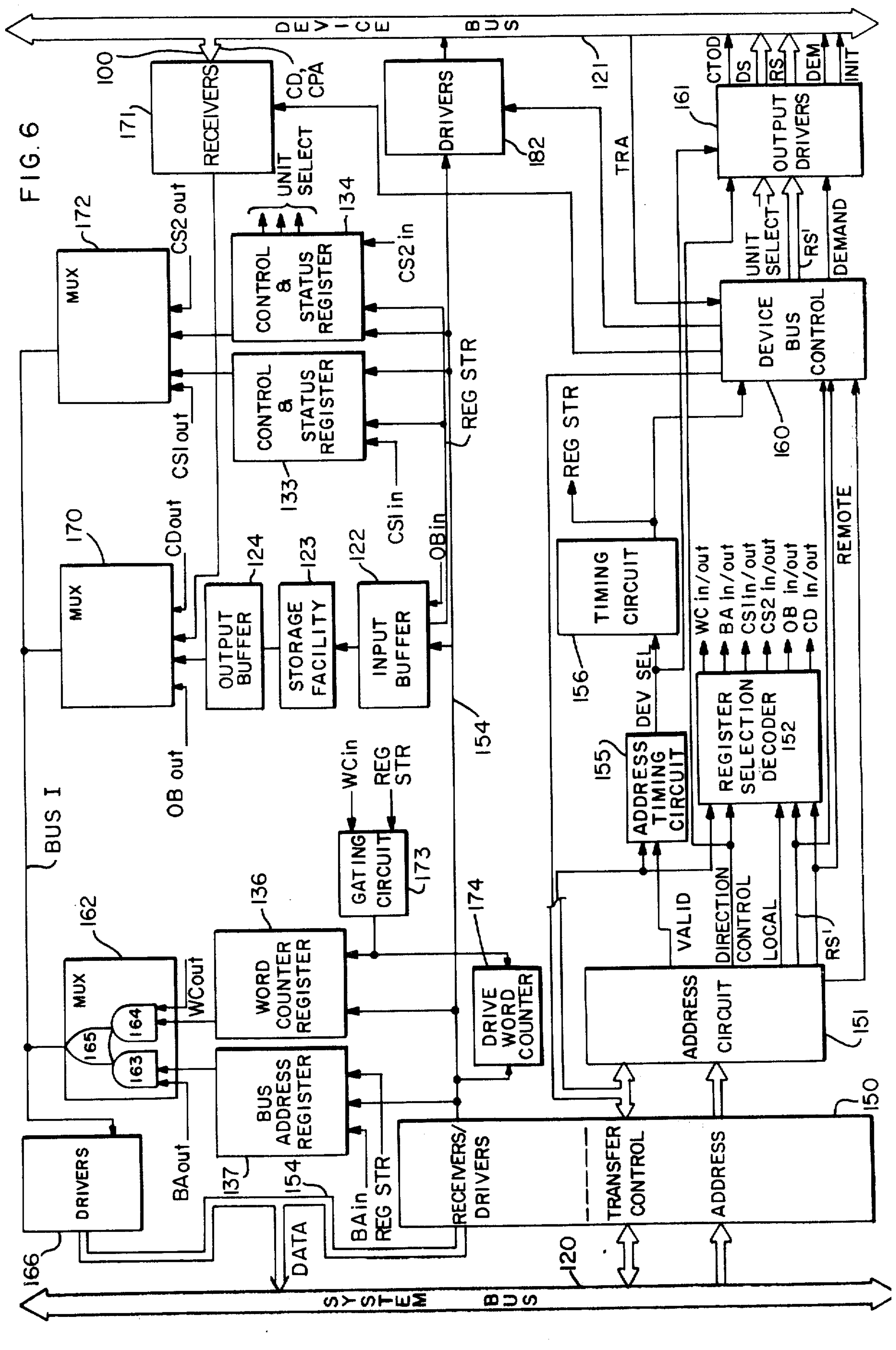
FIG. 6 is a block diagram of an asynchronous drive control path in a controller as adapted for connection to a system as shown in FIGS. 2 or 3.
Figure 7:
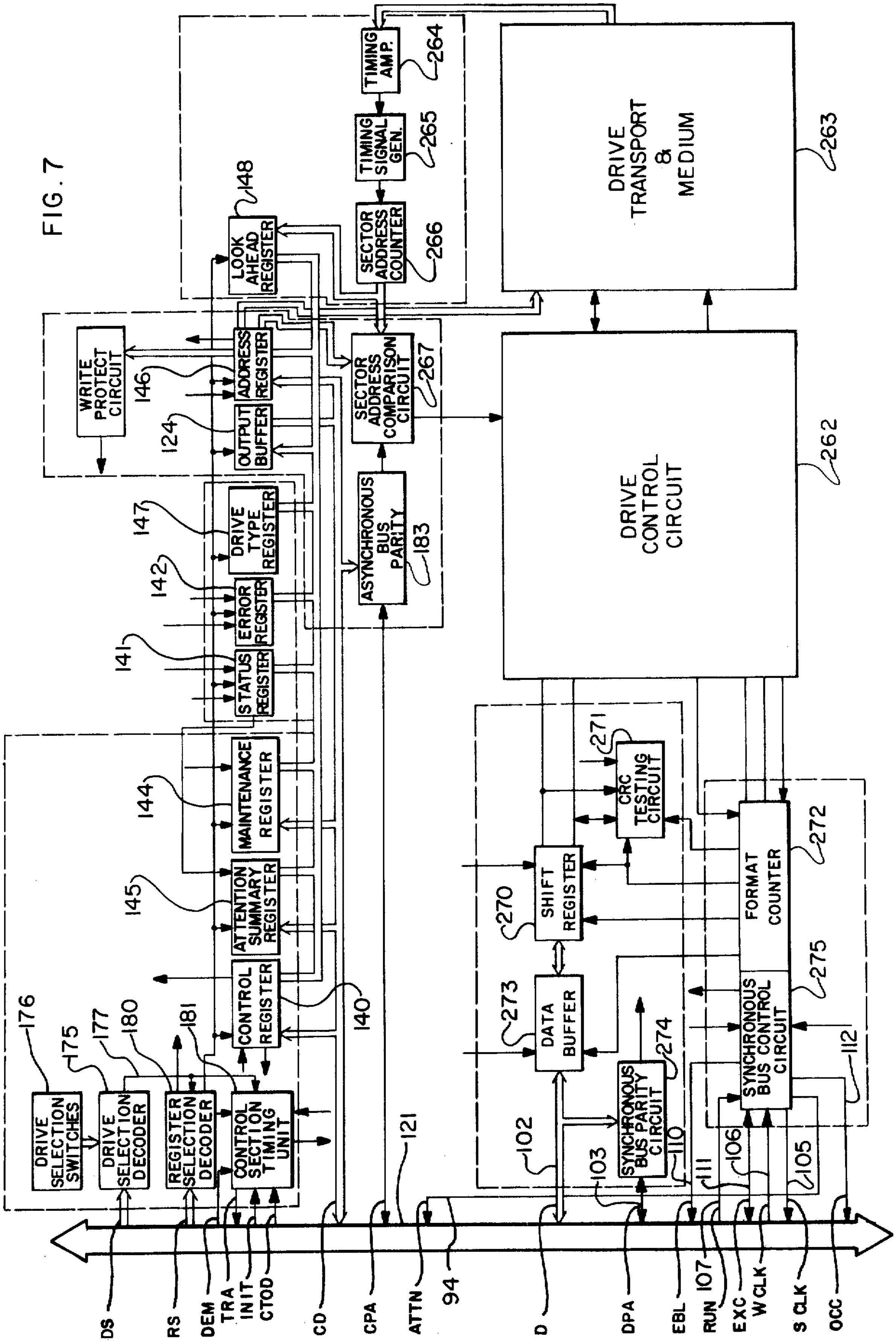
FIG. 7 is a block diagram of a drive constructed in accordance with this invention.

A typical drive control path is shown in FIGS. 6 and 7. The controller shown in FIG. 6 contains several registers, which are called local registers. They include:

1. Control and status registers 133 and 134 for receiving commands and for receiving and storing operational status information for the controller;

2. The output buffer 124; this register has a connection 124 (FIG. 5) to the drive control path and its contents may be retrieved under system control for diagnostic and other purposes;

3. A word counter register 136 for storing the number of words to be transferred; it counts each data word as it is transferred and disables the drive upon the completion of the transfer;

4. A bus address register 137 for storing the address of a location connected to the system bus 120, which is either sending or receiving the data.

FIG. 7 depicts a fixed-head disk memory unit as a typical drive for purposes of explanation. Such a drive contains the following registers, which are called remote registers:

1. A control register 140 analagous to the control and status register 133 (FIG. 6); it stores commands and other control information; the control register 140 and the control and status register 133 can be considered as a single register in which stages are distributed among the controller and each drive connected to the controller;

2. A status register 141 for storing non-error status bits and a summary error bit; one bit position, for example, indicates whether the drive is in a ready state;

3. An error register 142 for storing error information; other drives may contain more than one such register;

4. A maintenance register 144 for storing information useful in diagnostic and maintenance operations;

5. A stage in attention summary register 145; each drive has one stage for indicating whether it has generated an ATTN signal; this register can be considered as having individual stages distributed among each of the drives.

6. A desired track and sector address register 146 for storing the number of the driver track and sector at which a transfer is to start;

7. A drive type register 147 for storing information concerning the nature of the drive; and 8. A look-ahead register 148 for storing information concerning the actual rotational position of the disk.

Other registers which might be included in a fixed-head or other type of drive include:

1. A serial number register for displaying part or all of the device serial number; and 2. ECC position and pattern registers in drives having error-correcting codes for storing the position of an ECC pattern burst and the pattern itself.

Moving-head magnetic disk memory units normally will include:

1. An offset register for storing the amount of head offset in a moving head disk memory unit; such a register might also store information for controlling the enabling of header information or error correction circuits.

2. A desired cylinder address register for storing the cylinder address which is to be reached; and 3. A current cylinder address register for storing the actual head position over the disk in terms of a disk cylinder.

These registers are discussed more fully in connection with the operation of the drive control path.

All operations of the controller and drives in a secondary storage facility constructed in accordance with this invention are under the control of information stored in these registers in the controller (FIG. 6) and the drive (FIG. 7). For example, a transfer of data between the recording medium and a memory unit requires the central processing unit to transfer several items of information into the local and remote registers. The identification of the drive to be involved in the transfer is loaded into the control and status register 134 (FIG. 6). The register 134, in turn, produces corresponding unit select signals. The bus address register 137 receives the initial memory address while the word count register 136 receives a number (usually in two's complement) defining the number of data words in the block to be transferred.

Once the control and status register 134 contains the drive information, additional transfers are made to specific remote registers in that drive (FIG. 7). The track and sector address is loaded into the track and sector address register 146. If the disk were a moving-head disk, then other information might be loaded into offset and desired cylinder registers. Still other information concerning the function to be performed would be loaded into the control register 140. As apparent, each of these transfers involves operations for loading information into drive registers from the control section 80 in the device bus 121. Thus, they can be designated writing operations.

It is also necessary, from time to time, to retrieve the contents of certain registers to learn the status of the drive and controller (i.e., perform a reading operation). For example, the status register 141 contains a DRY bit position which indicates whether the drive is busy. The look-ahead register 148 may be read to determine the actual position of the disk.

Any time there is to be a transfer into or out of a local or remote register, address signals and transfer control signals appear on the system bus 120 shown in FIG. 6 including one set of direction control signals which indicate whether the transfer involves a reading or writing operation. For example, the transfer control signals discussed in U.S. Pat. No. 3,710,324 include CO and CI direction control signals. CONI and CONO signals discussed in U.S. Pat. No. 3,376,554 perform the same function. When the information is to move into a register, the information may appear on the system bus data lines simultaneously with or slightly after address and transfer control signals appear on the address and transfer control lines, depending upon the characteristics of the particular system.

Receivers 150 in a controller (FIG. 6) comprise buffer circuits and pass the address signals and direction control signals to an address circuit 151. Each register has a unique address which the address signals designate and the address circuit 151 uses the address signals to indicate whether the address is for a register in the controller or in an associated drive. Thus, these signals implicitly indicate whether the designated register is a local or remote register and the address circuit 151 produces a corresponding LOCAL or REMOTE signal. Register selection signals (RS') from the circuit 151 pass to a register selection decoder 152 and to a device bus control circuit 160.

A. Local Transfers

When the address signals indicate that a register in the controller is to be selected (i.e., the address circuit 151 generates a LOCAL signal), the decoder 152 subsequently produces a signal which selects both the local register and the direction of the transfer. Each conductor from the decoder 152 is really two wires; one wire corresponds to a writing operation; the other, a reading operation. Thus, the decoder produces a WCin selection signal when a word count is to be stored in the word count register 136. To read the contents of the word count register 136, the decoder would produce a WCout selection signal.

Other transfer control signals from the bus 120, usually delayed for some period following the appearance of the address signals, enable the decoder 152 to produce an appropriate selection signal and enable an address timing circuit 155. These transfer signals may be either DATI, DATO, CONI or CONO signals in the system of FIG. 2 or MSYN and SSYN signals in the system of FIG. 3. The address timing circuit 155 produces a delayed DEV SEL signal in response to a first synchronizing signal if the address circuit has validated the incoming address and produced a VALID signal. The DEV SEL signal energizes a timing circuit 156. The timing circuit 156 transmits a REG STR pulse after the appearance of a signal from the decoder 152 and, in a writing operation, loads information on a control data wire 154 into the selected local register. The timing circuit 156 may also couple the DEV SEL signal to the device bus control circuit 160 to produce another transfer control signal on the system bus 120 to indicate that the transfer is complete (when such a signal is necessary for a system operation).

To read the contents of the word count register 136, for example, the address and transfer control signals cause the decoder 152 to transmit the WCout selection. This signal is one input to a multiplexer 162 which selectively couples the output of either the word count register 136 or the bus address register 137 onto the intermediate bus designated BUSI. Specifically, the multiplexer 162 includes an AND gate 163 which receives the output from the bus address register 137 and an BAout signal from the decoder 152; and an AND gate 164 which receives the output of the word count register 136 and the WCout signal from the decoder 152. An OR gate 165 couples the selected one of the AND gates 163 and 164 onto the BUSI bus and then, through drivers 166, onto the system bus 120.

The multiplexer 162 is shown diagramatically only. In an actual circuit there would be an AND gate associated with each bit position in each of the registers 137 and 136. The BAout and WCout signals would then enable all the AND gates associated with the respective registers.

The drive control path shown in FIG. 6 also contains multiplexers 170 and 172. Multiplexer 170 selectively couples signals onto the BUSI bus either from the output buffer 124 or from the drive coupled from the device bus through receivers 171 in response to OBout or CDout signals from the decoder 152. CS1out and CS2out signals from the decoder 152 control the multiplexer 172 so it selects and couples the output of either the register 133 or the register 134 onto the BUSI bus.

While reading control information from a local register, the divice bus control circuit 160 may, if the system requires it, issue another synchronizing control signal which indicates the transfer is complete. Once the REG STR signal terminates and the optional synchronizing control signal appears, the controller and system have completed the transfer (i.e., the selected local register has been read).

The steps for loading information into a local register are similar. The direction control signals from the address circuit 151 indicate a writing operation. Thus, an input conductor for a selected register, rather than a multiplexer, is energized by the decoder 152. When new information is to be stored in the word count register 136, the decoder 152 produces the WCin signal. The information to be stored appears on the bus 154 which is equivalent to the control data wires 84 in FIG. 4. The coincidence of the REG STR and WCin signals loads the word count register 136.

Normally the selection signal from the decoder 152 and the REG STR signal from the timing circuit 156 are applied directly to input gating circuits in their respective registers. FIG. 6, however, shows a gating circuit 173 whose output is applied to both the register 136 and a drive word count register 174. The register 174 stores the number of words transferred between the controller and drive. As shown in FIG. 6, this register is not connected to the BUSI bus, so its contents cannot be read.

Thus, transfers of control information to or from local registers use the same sequence as the transfer of similar information to or from analogous registers in other units connected to an input-output bus or a common bus in the two disclosed systems. When the transfer involves a remote register, the controller must route the control information to involve the appropriate remote register. The control information still passes through the controller, but the controller must additionally control each transfer with the designated register.

B. Remote Transfers

When an address on the system bus 120 designates a register in a drive, the address circuit 151 produces a REMOTE signal which is applied to the device bus control 160. In response to this signal the device bus control 160 is enabled to pass the RS' signals from the address circuit 151 to the output drivers 161. The UNIT SELECT signals from the control and status register 134 and the direction control signals are also inputs to the drivers 161.

The appearance of a valid address, with its concomitant VALID signal, and the transfer synchronizing signal from the system bus 120 produces the DEV SEL and the REG STR signals as previously discussed. The DEV SEL enables the output to the device bus drivers 161 to couple the RS', UNIT SELECT, and direction control signals onto wires in the control set 83 of the device bus 121 as RS, DS and CTOD signals respectively. In addition, the REG STR signal causes the control 160 to produce a DEMAND signal which passes through the enabled output drivers 161 as the DEM signal.

Now referring to FIG. 7, a drive selection decoder 175 in each drive compares the incoming DS signals with signals from drive selection switches 176 to determine whether the DS signals identify that particular drive. If they do, the decoder 175 produces an enabling signal on a conductor 177 to activate a register selection decoder 180 and a control section timing unit 181. The register selection decoder 180 receives the RS signals and in response produces signals which are coupled to the selected register in the drive, e.g., registers 140, 141, 142, 144, 145, 146, 147 or 148. These selection signals enable subsequent timing signals from the timing unit 181 to effect a transfer. The timing unit 181 also receives the DEM and CTOD signals from the bus 121 and transfers a TRA signal onto the bus when the drive has moved control information onto the data set 81 or that the data on the set 81 has been stored.

Referring again to FIG. 6, the device bus control 160 receives the TRA signal and then either enables data to pass through the receivers 171 in response to the CDout signal from the register selection decoder 152, subsequently or disables the drivers 182 if the decoder has produced the CDin signal. In addition, the control 160 can produce the previously discussed optional synchronizing signal for controlling the transfer between the system and the controller. Thus, the decoder 152 produces a CDin or CDout signal during each remote register transfer.

A more thorough understanding of these remote register transfers will be obtained from a discussion of reading and writing operations in some detail in terms of the signal transfers between the controller in FIG. 6 and the registers in FIG. 7.

1. Reading Operation

Figure 8:
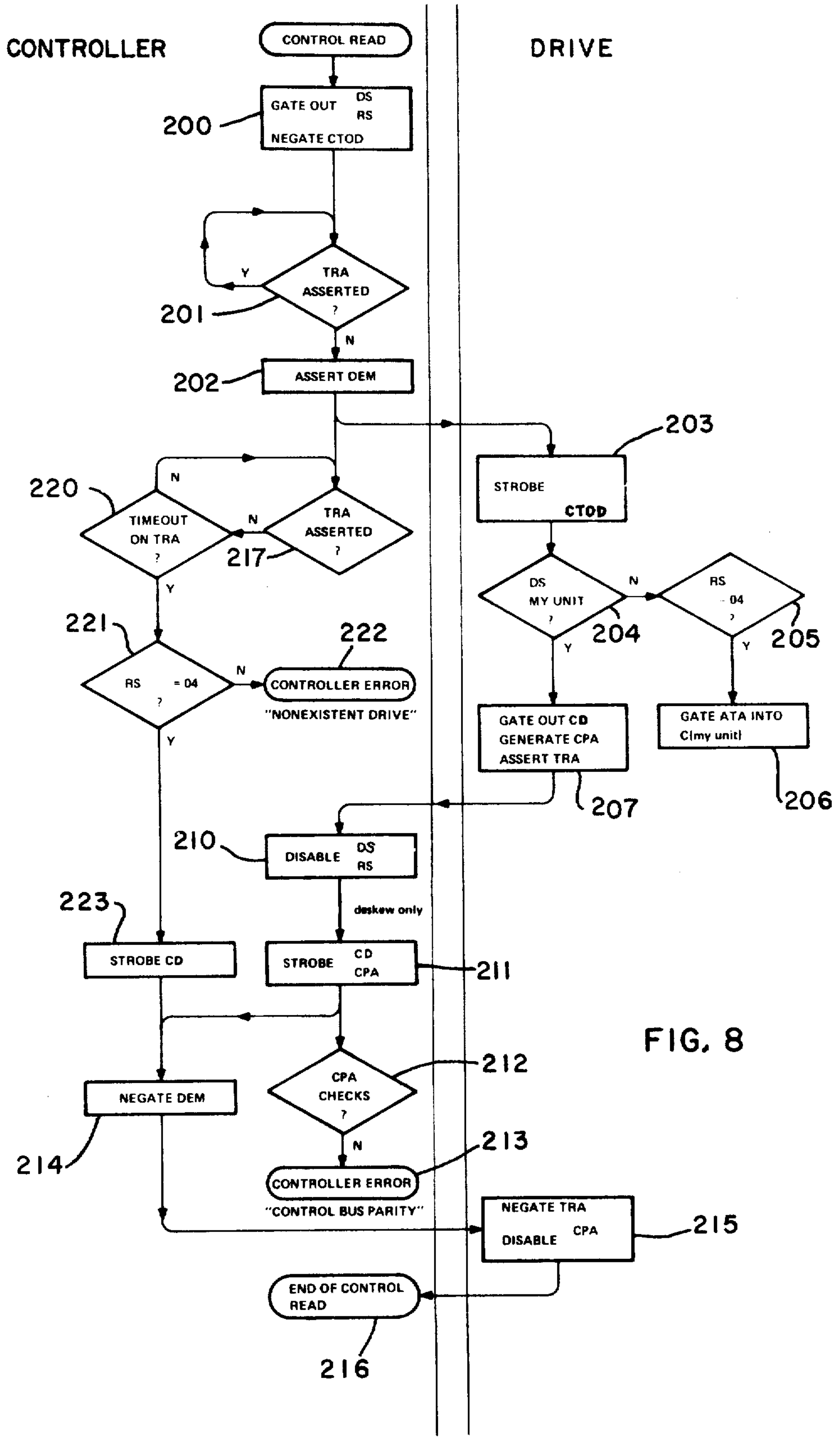
FIG. 8 is a flow chart of the operation for retrieving information in a register shown in FIG. 7.
Figure 9:
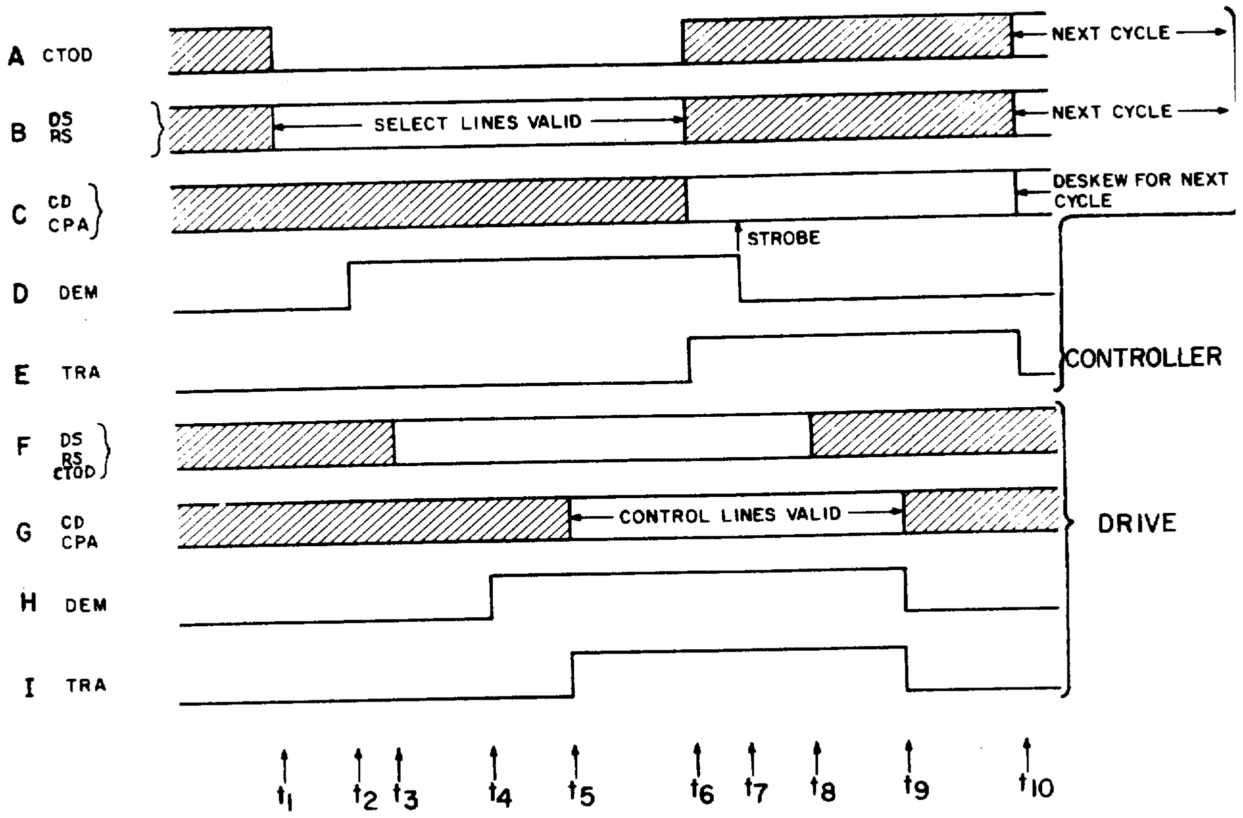
FIG. 9 includes timing charts corresponding to FIG. 8.

FIG. 8 is a flow chart of the steps necessary to read control information in a remote register while FIG. 9 illustrates the timing of such signals. Step 200 and Charts 9A and 9B represent the process of placing the appropriate values of the DS, RS and CTOD signals onto the device bus 121 from the output drivers 161 shown in FIG. 6 at time *t*1. If a TRA signal from a previous transfer with any drive connected to the controller is asserted, the controller waits for it to terminate as represented by step 201. At the completion of this interval, step 202 and Chart 9D indicate that the device bus control 160 and the output drivers 161 couple the DEM signal onto the device bus at the time *t*2.

Now referring to FIGS. 6, 7, 8 and 9 the signals on DS, RS and CTOD wires from the controller arrive at the drive at time *t*3 (Chart 9F). The interval from *t*1 to *t*3 representing a bus signal propagation delay. After a similar delay from time *t*2, the DEM signal is received at the drive at time *t*4 (Chart 9H) causing the control section timing unit 181 to load (or strobe) the CTOD signal as represented by step 203. The drive selection decoder 175 will have already determined whether the drive is the selected drive. If the DS signals do not designate the drive (step 204), the drive in step 205 determines whether the RS bits designate the attention summary register. If a register other than the attention summary system is designated, but the DS bits do not select a drive, no further steps occur in that drive. If the attention summary register is addressed, then the ATA signal is sent (step 206) as described later.

Assuming that the DS signals identify the drive in FIG. 7, the control section timing unit 181 at time *t*5 loads the information from the selected register onto the control data lines in the bus 121 as disclosed in step 207 and Chart 9G. At the same time a control bus parity circuit 183 generates a parity bit which is loaded onto the CPA wire 85 and the unit 181 transmits the TRA signal at time *t*5 as shown in Chart 9I.

When the controller receives the control information and the TRA signal as shown in Charts 9C and 9E at *t*6, the device bus control 160 may immediately disable the DS, RS and CTOD signals (Charts 9A and 9B and step 210). After a short delay, the device bus control 160 opens the receiver 171 at time *t*7 to load the control information and parity signal from the device bus 121 through the multiplexer 170 and drives 166 onto the system bus 120 (step 211). When the system receives the control information, the control 160 terminates the DEM signal (Chart 9D and step 214) so that the drive senses the transition of the DEM signal (Chart 9H) and terminates the TRA signal (Chart 9I and step 215) and the control data and parity signal. Once the controller senses the termination of the TRA signal at time *t*10 (Chart 9E), the transfer is complete (step 216).

As apparent, the control information at the receivers 171 in FIG. 6 is valid from time *t*6 to time *t*10 (Chart 9C). The TRA signal can therefore be used to synchronize operations on the system bus 120 and the device bus 121.

Referring to FIG. 8, once the controller transmits the DEM signal in step 202, it begins timing a response interval. This is represented by steps 217 and 220. If the drive transmits the TRA signal before the predetermined time interval expires, the interval timing operation terminates in step 217. If not, the controller, at the end of this interval determines whether the attention summary register 145 is being read (step 221). If it is not, then no device has responded and a non-existent drive has been designated. Thus, step 221 branches to step 222, and the controller sets an NED bit position described later in the control and status register 134 (FIG. 6). If the attention summary register 145 has been addressed, step 221 branches to step 223, and all the information on the data set 81 are sensed before terminating the DEM signal at step 214.

If a parity error is discovered in step 212 during a transfer of information from a drive (step 211), step 213 causes an MCPE bit position in the status and control register 133 to be set.

2. Writing Operation

Figure 11:
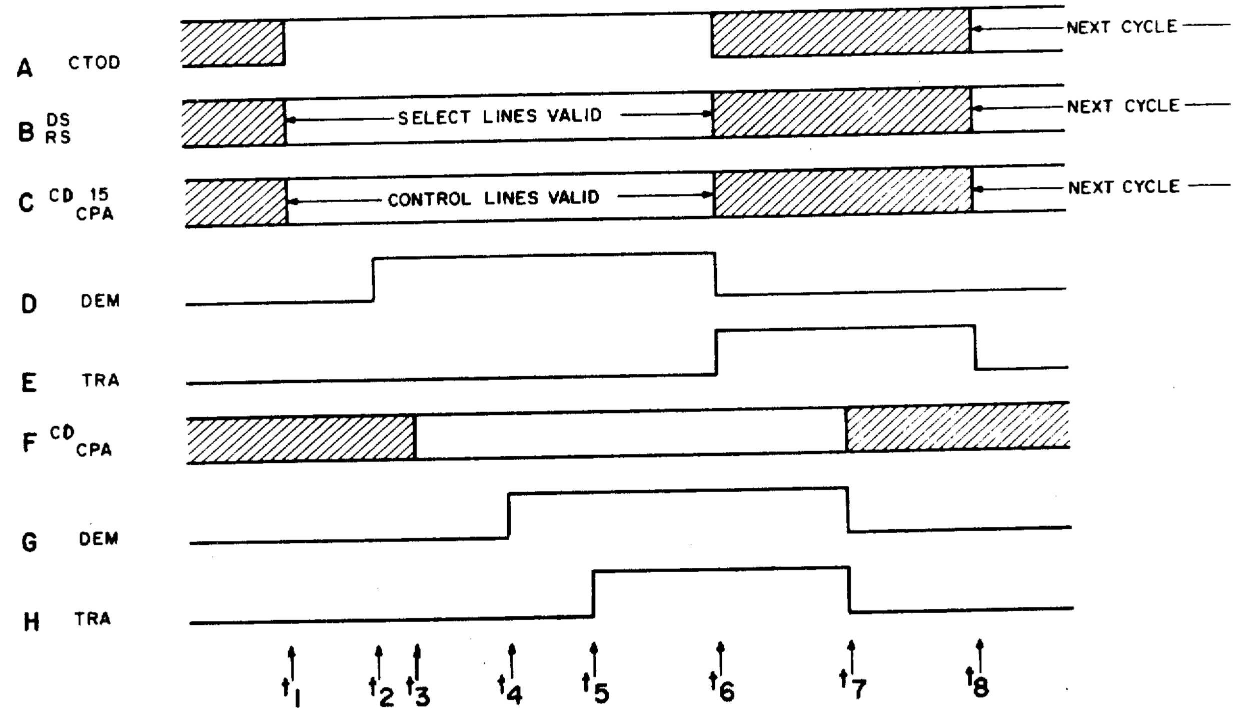
FIG. 11 includes timing charts corresponding to FIG. 10.
Figure 10:
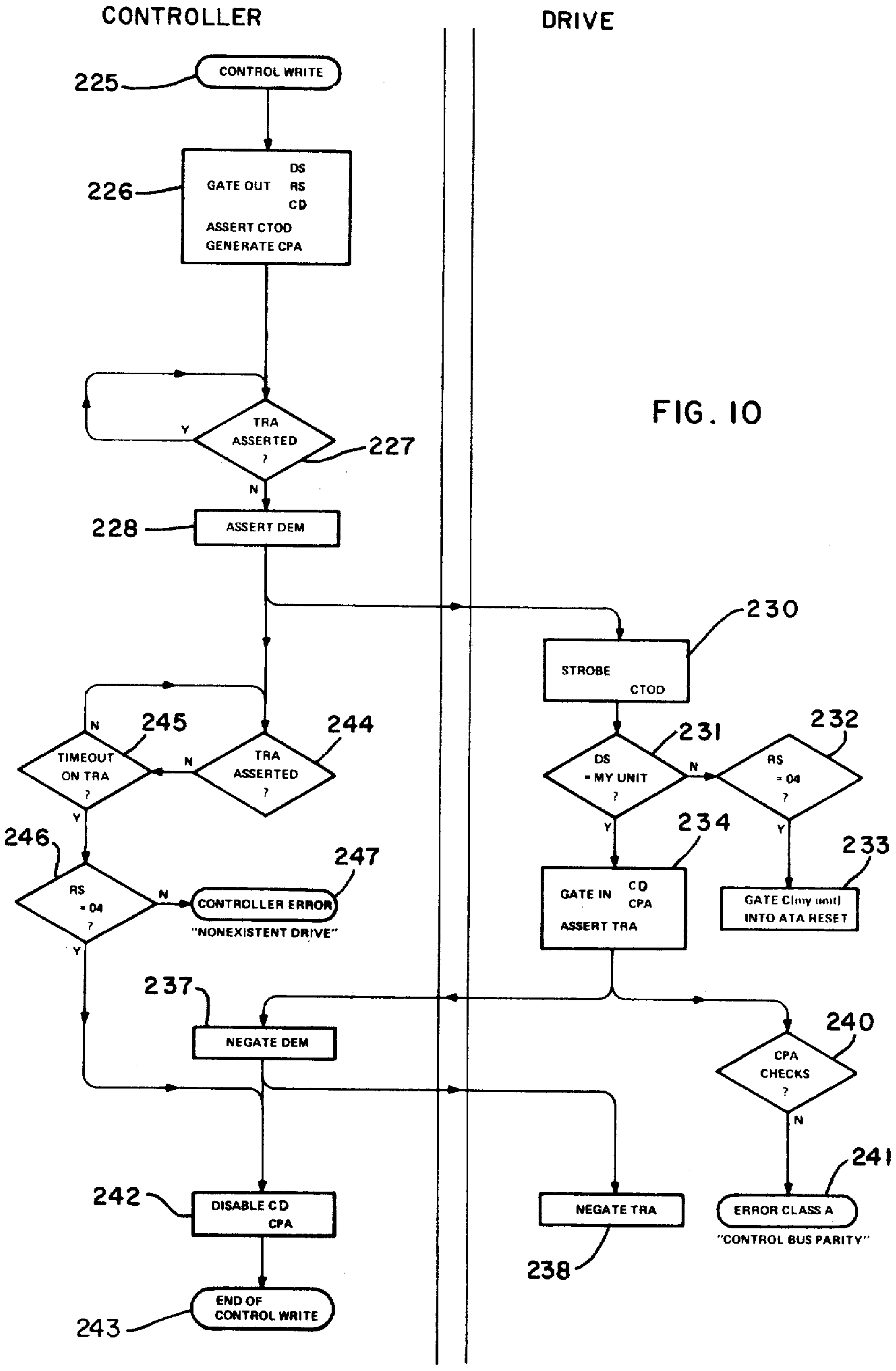
FIG. 10 is a flow chart of the operation for storing information in a register shown in FIG. 7.

FIG. 10 is a flow chart for writing control information into a remote register while FIG. 11 is a corresponding timing diagram. When the controller receives a command to write control information (step 225) it transfers DS, RS and CTOD signals onto the control information lines and a parity signal onto appropriate wires in the control section 80. This occurs at step 226, which corresponds to time *t*1 as shown in Charts 11A, B and C. The control information passes through the drivers 182, shown in FIG. 6, under the control of a gating signal from the device bus control 160, which responds to the DEV SEL signal as previously discussed. The control signals pass through the output drivers 161.

If a TRA signal from a previous transfer with any drive connected to the controller is still asserted, the controller waits for it to terminate as shown in step 227 and discussed with respect to the reading operation. Then at time *t*2 the controller, in step 228, transmits the DEM signal onto the device bus 121 as shown in Chart 11D. Steps 230, 231, 232 and 233 are analagous to steps 203, 204, 205 and 206 in FIG. 8. The control information on the data set 81 arrives at the drive at time *t*3 (Chart 11F) and the DEM signal arrives at time *t*4 (Chart 11G). In response to these signals, the control section timing unit 181 in the drive (FIG. 7), in step 234 and at *t*5 in Chart 11H, loads the control information into the designated register and the CPA signal into the parity circuit 183. In steps 240 and 241, the circuit 183 provides a parity error signal if an error exists to set a PAR bit position in the error register 142.

At *t*5 the drive also transmits the TRA signal (Chart 11H), which arrives back at the controller at *t*6 (Chart 11E). In response, the device bus control 160 turns off the drivers 182 and the output drivers 161 thereby effectively disconnecting the controller and drive by terminating all signals from the controller on the device bus at *t*6 as shown in Charts 11A, B and C and including the DEM signal (Chart 11D). At *t*7, Chart 11F shows that the control information and parity signal from the controller or the data set 81 terminate at the drive as does the DEM signal. Thus, at *t*7 the drive terminates the TRA signal (Chart 11H) and the controller senses this termination at *t*8 (Chart 11E). This completes the writing operation and permits initiation of another cycle.

Now referring to FIG. 10, after the controller asserts the DEM signal in step 228, it starts timing a response interval like that in a reading operation. Steps 244, 245, 246 and 247 are analogous to steps 217, 220, 221 and 222 in FIG. 8. If the attention summary register 145 is being loaded, then the information remains on the control data wires until the end of the time-out period as described later. The controller then completes the writing operation by removing the control information in step 242 to complete the operation with step 243.

C. Local and Remote Registers

Local registers in the controller and remote registers in the drives store control or status information. Some registers, such as the word counter register 136, contain one item of information, such as the word count, so all bit positions or stages are interrelated. Other registers store diverse information in one or more groups of registers. For example, the control and status register 133 has a stage for indicating special conditions and another stage for indicating that a transfer related error has occured. Registers in which all stages are interrelated may be arranged so either data can only be retrieved from them by the system (i.e., read-only register) or data can be retrieved or altered in them by the system (i.e., read/write register). Registers in the former category are denoted by a cross to the right of the designation in FIGS. 12 and 13. In registers which contain independent stages, each stage may be arranged so its data either may only be retrieved (i.e., a read only stage) or may be retrieved or altered (i.e., a read/write stage). A cross above a stage indicates that it is a read-only stage.

The particular assignment of bit positions or stages made in the following discussion of local and remote registers is for purposes of explanation only. Other assignments may be made. Further certain of the defined stages and the information they represent may be omitted and other stages representing other information may be substituted or added.

1. Control and Status Register 133

Figure 12:
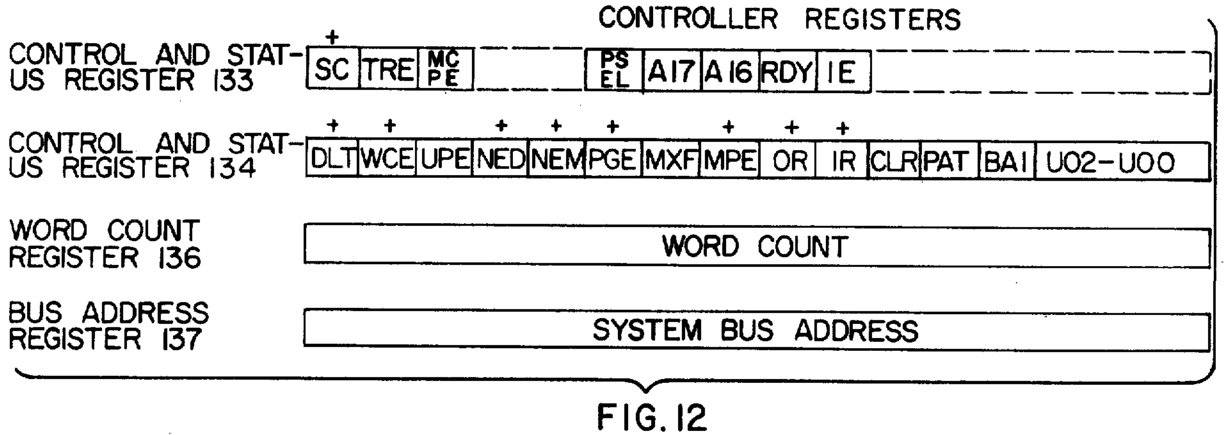
FIG. 12 depicts the organization of registers adapted for use in a controller.

The control and status register 133 is a multi-stage or multiple bit position register. Some stages are located in the controller; others are located in each drive. The controller stages are shown in FIG. 12. One such stage is an SC stage which is set to indicate that (1) a transfer related error has occurred (i.e., a TRE bit position is set), (2) that an MCPE bit position has been set because a parity error was detected during a remote register reading operation as previously discussed, or (3) that some drive connected to the controller has produced an ATTN signal on the wire 94 in the control set 83 (FIG. 4). The controller resets the SC bit position in response to a system resetting (INIT signal on the wire 95 in the control set 83, to a conntroller clearing signal which sets a CLR bit position in a control and status register 134 or in response to the correction of the condition causing the drive to assert the ATTN signal. This stage is located in the controller itself.

The TRE stage is a read/write stage in the register 133. It is set in response to the occurrence of a transfer related error signalled by certain stages in the control and status register 134 or in response to the simultaneous assertion of EXC and EBL signals on the wires 110 and 111 in the control set 104. The previously discussed INIT and CLR signals can reset the stage. In addition, the system can clear the TRE bit position by means of a local register writing operation.

As previously indicated, the controller checks the parity signal on the wire 85 in the data set 81 (FIG. 4). If a parity error is detected, the MCPE bit position is set. The MCPE stage is a read only stage. Both INIT and CLR signals cause it to be cleared. A local register writing operation may also clear this stage.

A PSEL bit position is used when the synchronous data path can be selectively coupled to either of two system buses. It is cleared when the selected system bus is also the bus which connects to the control data path. When this stage is set, data is routed to the other system bus. An INIT or CLR signal or a local register writing operation will clear the stage to thereby restore the connection between the system bus which connects to the control data path.

The control and status register 133 shown in FIG. 12 also contains A17 and A16 bit positions which are read/write stages. These positions can augment the contents of the bus address register 137 if the address is not sufficient to uniquely identify a location. Either the INIT or CLR signal or a local register writing operation can clear these two bit positions.

A RDY bit position indicates the condition of the synchronous data path in the controller and comprises a read/write register stage. It sets when power is applied and at the completion of each transfer operation over the synchronous data path. Whenever a data transfer function is received in the register 133 with the GO bit set, the RDY stage is reset.

An IE bit position is set by a local register writing operation to cause the controller to interrupt the system connected to the system bus 120 in response to the assertion of a RDY or ATTN signal. It enables other controller circuits to respond to various error conditions or to the completion of an operation to produce an interrupting signal. This bit position is reset when the system interruption circuitry recognizes the interruption or in response to an INIT or CLR signal. If a local register writing operation resets this stage, the controller can not interrupt the system and any pending interruptions are cancelled.

Several FUNCTION signals designate a specific operation the drive is to perform. They are received by the controller, although the corresponding register stages are located in the drives. These signals define various functions which may involve a data transfer. The register stages are cleared by an INIT or CLR signal. A DRIVE CLEAR operation defined by the FUNCTION bits causes the stages to be cleared. Typical FUNCTION signals also produce the previously discussed READ, WRITE and WRITE-CHECK operations or a SEARCH operation to locate a particular area in the drive without a data transfer taking place.

When a GO bit position in the register 133 is set, the drive performs the operation identified by the FUNCTION bits. The INIT signal will clear the GO bit and abort any operation in response to a command. The GO bit is also cleared when an operation over the synchronous data path is completed. Setting the GO bit also can reset various error condition bit positions as discussed below.

2. Control and Status Register 134

All stages in the control and status register 134 are located in the controller. Individual register stages reflect the operation and status of the controller, especially error conditions which might exist. A DLT bit position is one example of such a stage which is set when the controller is not able to supply or accept in a timely fashion a data word over the synchronous data path during a writing or reading operation, respectively. In a two-port operation when the PSEL stage in the system 133 is set, an INIT signal at the second system bus also sets the DLT stage if a transfer is then occuring over that second bus. Any time the DLT stage sets, the TRE stage in the register 133 is set.

A WCE bit position is set during a WRITE-CHECK operation when the recorded data from the drive does not match the corresponding word in a memory location in the system. This stage sets the TRE stage in the register 133.

A UPE bit position is set during a data transfer in response to a WRITE or WRITE-CHECK command over the synchronous data path when a parity error is detected on the system bus 120. The TRE stage also sets in response to such a parity error.

An NED bit position indicates a non-existent drive and is set by the controller as described with reference to FIGS. 8 and 10. This also causes the TRE stage to be set.

If a system location specified by the controller does not exist, the controller senses an incompleted transfer operation and thereby sets a NEM bit position and the TRE stage.

When the system sends a READ, WRITE or WRITE-CHECK command while the controller is already involved in another transfer, the controller sets a PGE bit position in the register 134. This causes the TRE stage to set.

Any time a drive does not respond to a data transfer command within a predetermined time, the controller sets MXF and the TRE bit positions.

An MPE and the TRE bit positions set if the controller detects a parity error during a transfer over the device bus in response to a READ or WRITE-CHECK COMMAND.

All the foregoing stages in the register 134 can be cleared by any one of four procedures. First, a system resetting signal clears the stages. Secondly, the system can issue a clearing command to set the CLR bit position as discussed later. Thirdly, the system can load the registor 133 with the combination of FUNCTION bits which designate a data transfer operation and set the GO bit position. Finally, a word can be loaded into the register 133 which clears the TRE bit position. In addition, the UPE and MXF bit positions can be cleared directly by introducing a local register writing operation.

OR and IR bit positions in the register 134 are used in diagnostic operations and are set when the output buffer register 124 or the input buffer register 122, respectively, in the synchronous data path are empty. A system resetting signal, a local register writing operation to set the CLR bit, or an operation for reading the information in the respective buffers clears the OR stage or sets the IR stage.

Sometimes it is desirable to use either even or odd parity coding during a transmission over the data paths. A PAT bit position in the status register 134 can be set to produce even parity coding and decoding and reset to produce odd parity operations. A local register writing operation alters the state of the stage.

Normally the bus address register 137 is incremented or altered during each transfer to identify system locations in succession. A BAI stage in the register 134 can be set during a local register writing operation to inhibit the incrementing steps, provided the controller is not then involved in a data transfer. This condition is indicated when the RDY stage is set. Either a system resetting signal or CLR signal can clear the BAI stage.

The UO2 through UO0 bit positions receive their information during a local system writing operation. These stages are cleared in response to a system resetting signal or to a CLR signal. Once a transfer starts, they can be altered without interfering with the transfer.

3. Word Counter Register 136

The word counter register 136 initially stores the initial word count, i.e., the number of words to be involved in a data transfer. The number stored is usually the two's complement of the actual word count and the register, which is a counter, is incremented during each transfer of a word over the synchronous data path between the controller and the system. When the register 136 reaches ZERO (i.e., the register overflows or issues a CARRY), the requested transfer is finished. This register can only be cleared by transferring a ZERO value to it through a local register writing operation.

4. Bus Address Register 137

Locations in the system from which data is retrieved or to which data is sent over the synchronous data path are identified by the bus address register 137. The A16 and A17 bit positions in the register 133 augment this information as noted above. The register 137 is a counter which is incremented in response to each data word transfer in order to identify the successive locations corresponding to the successive words involved in a transfer operation. Either a system resetting or CLR signal clears the register 137.

5. Data Register 135

A data register can be addressed, primarily for diagnostic purposes, even though there may be no physical register. Specifically, if the data register is addressed during a local register writing operation and the IR signal indicates that the storage facility 123 is not full, the information on the control data wires 84 is loaded into the input buffer 122 (FIG. 6). This condition is represented by an OBin signal. On the other hand, an OBout signal is produced when the data register 135 is addressed during a local register reading operation and OR signal indicates that data is present. The OBout signal causes the information in the output buffer 124 to be loaded onto the system bus 120.

6. Control Register 140

Figure 13:
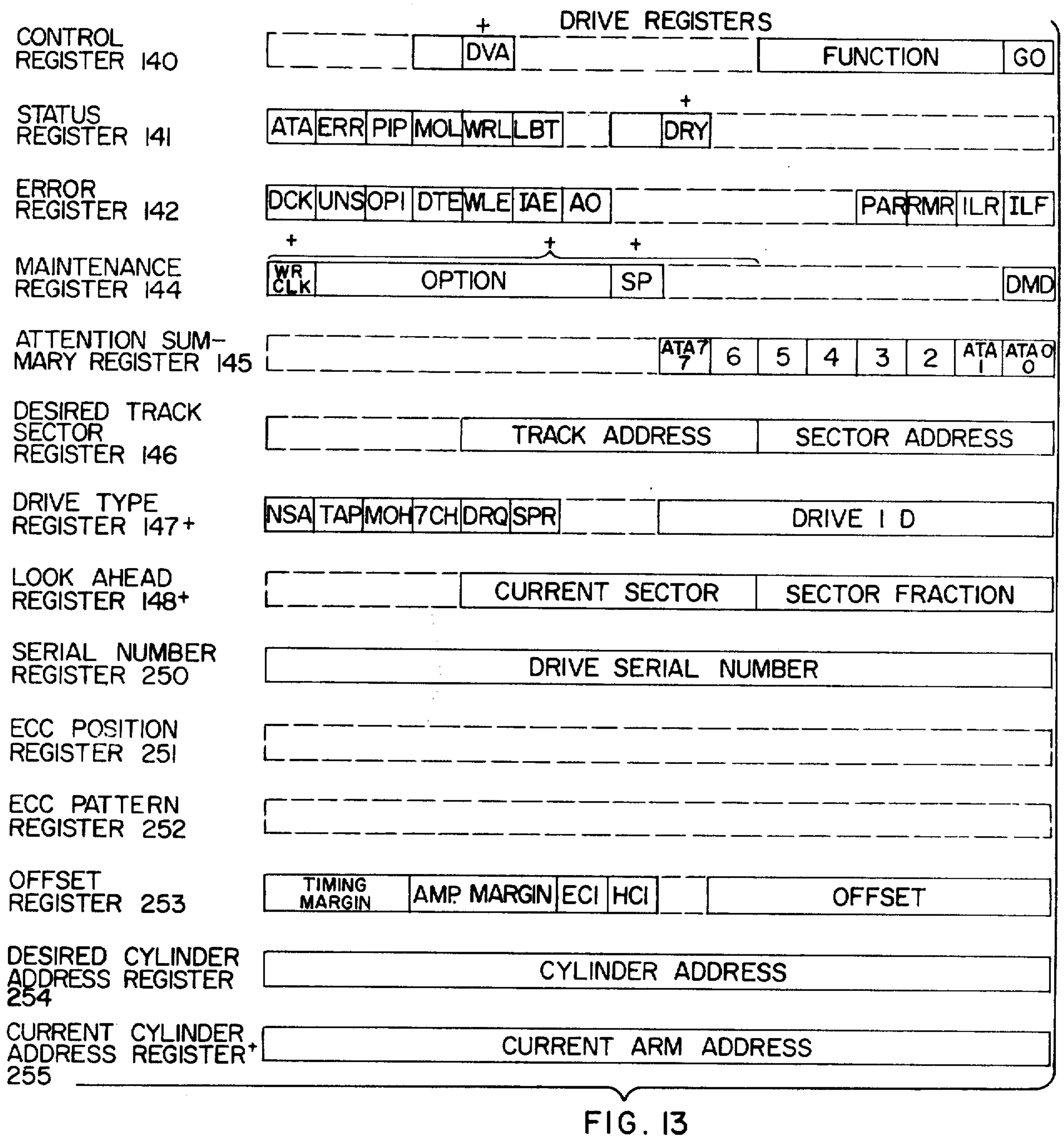
FIG. 13 depicts the organization of registers adatped for use in a drive.

Now referring to FIG. 13, which contains in diagrammatic form, the organization of typical registers in a drive, the control register 140 stores the FUNCTION and GO bits previously described with respect to the control and status register 133. Whenever the register 133 is loaded, the controller produces a remote writing operation to load FUNCTION and GO bits into corresponding stages in the designated drive. The DVA Stage is set whenever the drive is available for operation and is a read-only position.

7. Status Register 141

The status register 141 contains the status of the drive. The contents of any bit position in the register 141 are dependent only upon monitoring circuits within the drive. This register cannot be loaded from the controller.

Within the register 141, an ATA bit position and an ERR bit position are related. The ERR bit position is set whenever any other stage in the error register 142 sets. This, in turn, sets the ATA bit position in the drive, which is also set whenever operations in response to a SEARCH command are complete. A system resetting or a CLR signal will clear the ATA and ERR stages. It is also possible to clear the ATA stage by clearing the corresponding location in the attention summary register 145 as described later or by using a local writing operation to transfer a new command to the drive which sets the GO bit position. The last two methods do not clear the error indicators themselves.

Whenever an operation in response to a SEARCH command is in progress, a PIP stage is set. Seeking operations, as apparent, are applicable only to a moving-head disk memory or equivalent units. Once the operation is completed, this stage is cleared.

Still referring to the register 141, MOL and DRY stages are set when the drive is in an operating condition; that is, the MOL stage is set when the drive power is on and, in the case of a continuous moving medium such as a disk or drum, the medium is up to speed. The DRY stage is set to indicate that the drive can accept a command while the drive is not in an operating condition; the DRY bit position is cleared in response to a data transfer command with the GO bit position set. Any change of state of the MOL stage also causes the ATA stage in the drive to be set.

A WRL stage is set whenever an address in the desired track/sector register 146 identifies a track which is protected against writing operations. Otherwise, this stage is cleared.

An LBT bit position is set in response to a transfer over the data set 101 (FIG. 4) to or from the highest sector (i.e., the last sector) on a drive. This stage can be cleared by a system resetting a CLR signal, by transferring a new address into the register 146 or by clearing the drive.

8. Error Register 142

Now referring to the error register 142, a DCK bit position is set whenever circuitry in the drive detects an error during a reading operation over the data set 101 in response to a READ or WRITE-CHECK command.

If the power supply voltage for the drive falls below a safe level, a UNS stage sets; it is reset only when the supply voltage is above the minimum safe level.

During a data transfer operation circuits in the drive monitor index marks on the medium. If some number (e.g., three) of index marks pass after a data transfer command and the RUN signal is still absent, an OPI stage is set indicating a controller failure. In a disk unit, the passage of the number of index marks signifies more than two disk revolutions. If a SEARCH command does not terminate within two disk revolutions, a drive failure has occured and the OPI stage is also set.

The occurrence of any timing fault, such as the loss or addition of index or clock pulses, causes a DTE stage to set.

If the WRL bit position in the register 141 is set and a writing operation is attempted, the drive sets a WLE stage.

A remote transfer which loads a non-existent address into the desired track address register 146 causes the drive to set a IAE stage.

An AO bit position is set if, when the last block of the last track of a disk is read, the word counter register 136 in the controller does not indicate that the transfer is finished.

Any time a parity error is detected, either on the synchronous data path or the asynchronous control path, a PAR stage in the error register 142 sets.

If the GO bit position in the register 140 is set and the system attempts to load the control register 140, the error register 142 or the desired address register 146, an RMR stage sets.

Whenever the register selection (RS) signals do not identify a register in a designated drive, the drive sets an ILR stage.

FUNCTION bits which define an operation that the drive cannot perform cause an ILF bit position to be set.

The error stages are set immediately upon the condition being detected. This may result, in some cases, in an immediate interruption of the system, or in an interruption at the end of the complete transfer. In either case, the drive asserts the ATTN signal at the appropriate time to initiate the interruption. With the exception of the UNS stage, the other stages can be cleared by a system resetting signal or CLR signal or in response to a remote register writing operation designating the register 143. In addition, a DRIVE CLEAR command code sent to the register 140 clears the corresponding stages in the designated drive.

9. Maintenance Register 144

The maintenance register 144 is used for various diagnostic operations to facilitate an analyses of facility operation. It may contain, for example, a WRCLK bit position or stage to aid in simulating drive clocking pulse, an SP bit position to aid in simulating a sector or block pulse and other similar bit positions. Usually the maintenance register also contains a DMD bit position to place the drive in the maintenance or diagnostic mode of operation when that stage is set.

10. Desired Track/Sector Address Register 146

In the track/sector register 146 TRACK ADDRESS and SECTOR ADDRESS bit positions identify, respectively, the track and sector on a disk to be involved in a transfer. In a fixed-head unit, the TRACK ADDRESS bits identify a specific head. The register 146 can be incremented by successive sector signals so that successive sector and tracks can be involved in a transfer. When the last track and sector address allotted to any specific drive have been identified, the LBT stage in the status register 141 is set. The contents of the register 146 can be reset in response to system resetting or CLR signal or a DRIVE CLEAR command.

The drive type register 147 contains preset values to identify the nature of the drive. It might contain, for example, an NSA bit position to indicate a drive which does not use sector addressing or a TAP bit position to indicate a tape, rather than disk, drive. An MOH bit position can indicate whether a disk is a moving head disk while a 7CH bit position indicates, on a tape unit, whether the tape has seven or nine channels. A DRQ stage could indicate that a drive connects to two controllers. Sometimes a given drive might have a slave drive and an SPR bit position could indicate the presence of such a drive. DRIVE ID bit positions might identify the drive type and major variations.

11. Look-ahead Register 148

The look-ahead register 148 is a counter which contains the sector address of the sector currently passing beneath the read/write heads in CURRENT SECTOR stages. SECTOR FRACTION stages are incremented periodically to identify the fractional portion of the sector which has passed the heads. This information can be used in reducing disk latency times to thereby improve disk transfer rates.

The remaining registers shown in FIG. 13 are not necessary for the operation of a fixed head disk unit such as shown in FIG. 6. They are, however, useful in the operation of other drives and may be incorporated in them.

12. Drive Serial Number Register 250

For example, it may be desirable to include a drive serial number register 250 in magnetic tape drives or drives with removable disks. The contents of the register will then identify the drive unit during regular operation or duriing maintenance operations. The contents might be recorded in binary-coded decimal notation.

13. Error Correction Code Register 251 and 252

The function of the ECC position and the ECC pattern registers 251 and 252 shown in FIG. 13 has been discussed previously. The use of these registers with error-correcting code drives is known. The position and pattern are stored directly in the respective registers. They can be read through a remote register reading operation.

14. Offset Register 253

FIG. 13 also shows an offset register 253. TIMING MARGIN and AMP MARGIN bit positions are useful in providing timing and amplitude offsets for various operations. If an ECI bit position is set and the drive has an error-correcting code function, the function is inhibited. Similarly, setting an HCI bit position inhibits header comparison circuits. OFFSET bit positions contain the actual offset value to provide a proper incremental positioning of the read/write heads over the medium.

15. Desired and Current-Cylinder Address Registers 254 and 255

Two other registers useful in moving head disk memory units are a desired-cylinder-address register 254 and a current-cylinder-address register 255. The drive moves the heads to the track identified in the desired-cylinder-address register 254 and then transfers the contents of the register 254 into the current-cylinder-address registor 255. The register 255 then identifies the actual head position and is useful, for example, in determining the relative times necessary to move the heads from a current position to other positions.

16. Attention Summary Register 145

A status register 141 in each drive contains an ATA stage as previously described. The information in this stage can be transferred onto the data set 81 during a remote reading operation in which the register 141 is identified. Each ATA stage in each drive is a stage in the attention summary register 145 which has its own remote address. That is, within the register 145 there is a correspondence between the position of each stage (i.e., the wire in the control data wires 84 which receives the output of the ATA stage) and a drive, each ATA stage being coupled to a unique wire when the attention summary register is read.

Whenever any stage in an error register 141 sets, its corresponding ATA stage sets. This causes the drive to issue an ATTN signal onto the common ATTN wire 94 to thereby cause system operations to be interrupted. One of the first operations in the ensuing interruption routine is the reading of the attention summary register 145. This reading operation is described in detail later. When the reading operation is completed, the system knows exactly which drive or drives sent ATA signals and can immediately begin reading their respective error registers or other registers without any intervening polling operations.

Once all the interrupting drives have been serviced, it is necessary to reset each of the respective ATA stages. This may be done with a writing operation, which is similar to that shown in FIG. 10, or by an INIT signal or a DRIVE CLEAR command.

D. Drive Condition Detecting Circuit

Figure 14:
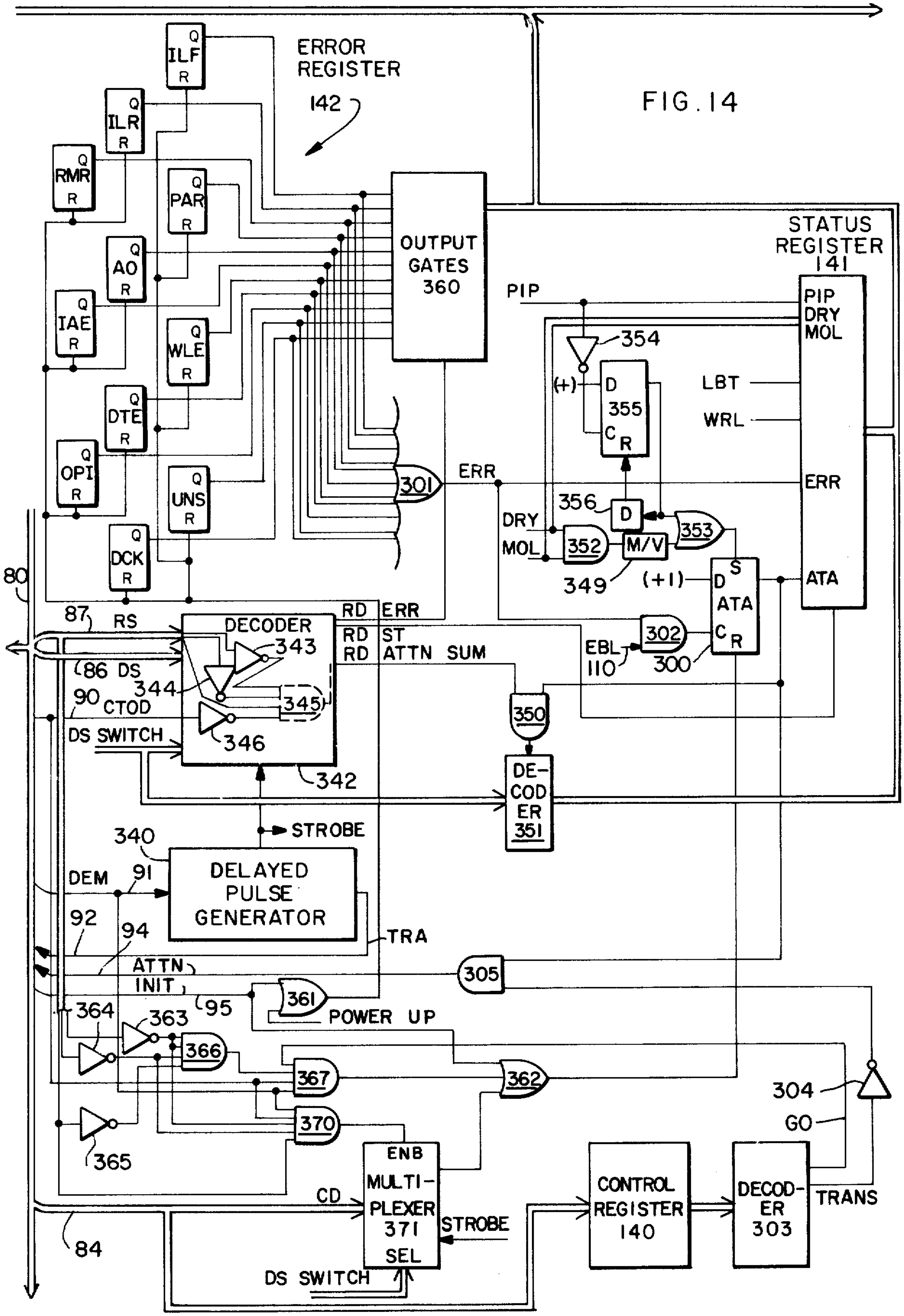
FIG. 14 is a detailed circuit schematic of typical drive condition detecting circuitry constructed in accordance with this invention.

As shown in FIG. 14, a drive condition detecting circuit formed in accordance with this invention connects to various conductors in the control section 80 of a device bus. This circuit, found in each drive, responds to signals from the control register 140, the status register 141, and the error register 142. The heart of the drive condition detecting circuit is a flip-flop 300 which produces the ATA signal and serves as the ATA stage in the status register 141. A signal from the flip-flop 300 causes the drive condition detecting circuit in FIG. 14 to produce the ATTN signal on the conductor 94 as described below.

The error register 142 shown in FIG. 14 comprises a plurality of flip-flop stages. The conditions for setting these stages are discussed previously. None of the circuitry for setting those stages is shown, as it is not a part of the invention and as such circuitry is known. Setting any one stage causes an OR gate 301 to produce an ERR signal which is sensed when a remote register reading operation is used to retrieve the contents of the status register 141. In addition, the ERR signal enables and AND gate 302 to clock the ATA flip-flop 300 to a set condition upon the transmission of an EBL signal on the conductor 110. As the error register 142 monitors transfer related errors, the ATA flip-flop 300 is set in response to an error condition only after a complete block of date is transferred in this embodiment.

Whenever the control register 140 receives an active transfer command, a decoder 303 produces a TRANS signal. For all other states of the register 140, an inverter 304 enables an AND gate 305. Thus, the absence of the TRANS signal and the presence of the ATA signal cause the AND circuit 305 to transmit the ATTN signal onto the ATTN wire 94. No further action occurs at this time in the drive.

Figure 15:
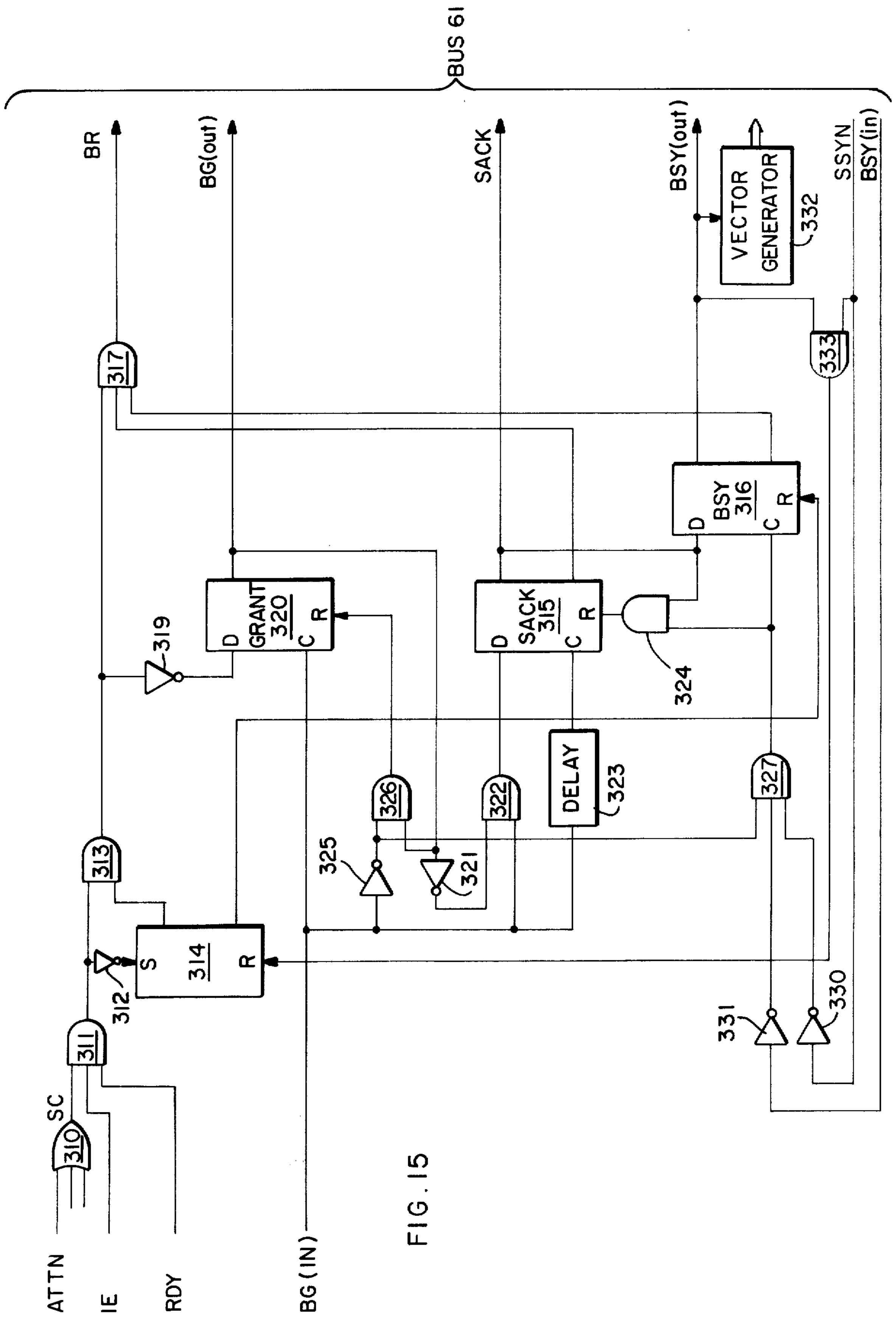
FIG. 15 is a detailed circuit schematic of a typical controller circuitry for interacting with the circuitry in FIG. 14.

FIG. 15 shows the circuitry in the controller which responds to the ATTN signal. This is an interruption circuit which, in the illustrated embodiment, is especially adapted for use with the central processing unit of FIG. 3. This circuitry is in the control path shown in FIG. 6.

When the ATTN signal is received on conductor 94, an OR gate 310 transmits an SC signal which conditions the corresponding stage in the control and status register 133 (FIG. 12). . Other, unrelated, conditions also produce the SC signal as previously discussed. Normally an AND gate 311 is disabled, so an inverter 312 keeps a latch 314 set. Another AND gate 313 is disabled by the AND gate 311. If the IE and RDY stages in the control and status register 133 are set, the shift of the SC signal to an active state energizes the AND gates 311 and 313 to produce an interruption request signal. The latch 314 remains set even when the AND gate 311 is energized so the AND gate 313 remains energized until the interruption sequence is completed. When the sequence terminates, the latch 314 is reset to disable the AND gate 313 as described later. If a SACK flip-flop 315 and a BSY flip-flop 316 are both reset, the AND gate 313 energizes an AND gate 317 to produce a BR signal which is coupled onto a corresponding conductor in the bus 61.

Priority interruption circuitry in the central processor unit 60 (FIG. 3) thereafter produces a BG pulse. The leading edge of the BG pulse received on a BG(in) conductor does not set a GRANT flip-flop 320 if the controller has transmitted a BR signal as the GRANT flip-flop 320 also receives the signal from the AND gate 313 through an inverter 319. This blocks the BG signal. If the controller is not issuing a BR signal, the flip-flop 320 sets to enable an inverter 325 and AND gate 326 to reset the flip-flop 320 on the trailing edge of the BG pulse thereby transferring the BG pulse back to the bus 61 over a BG(out) conductor for transmission to another controller. Assuming the controller has transmitted, and continues to tranmit, a BR signal, an inverter 321 enables another AND gate 322, so the leading edge of the BG signal also conditions the SACK flip-flop 315 to be set after the BG pulse passes through a delay circuit 323. The resulting SACK signal, which is an acknowledgement signal, is transmitted into a SACK conductor in the bus 61. Setting the SACK flip-flop 315 also disables the AND gate 317 and terminates the BR signal. In addition, with the SACK flip-flop 315 set, the BSY flip-flop 317 is conditioned to be set on the receipt of a clocking input and an AND gate 324 is enabled.

When the BG pulse terminates, the inverter 325 provides one enabling input to an AND gate 327. If a prior transfer has been completed, or is thereafter completed, both SSYN and BSY signals on SSYN and BSY(in) conductors from SSYN and BSY conductors in the bus 61 will become inactive. Inverters 330 and 331 then energize the enabled AND gate 327 to produce a clocking input to the BSY flip-flop 316 thereby setting that flip-flop and energizing the AND gate 324 to reset the SACK flip-flop 315. When the BSY flip-flop 316 sets, it produces a BSY signal on a BSY(out) conductor for transmission onto the BSY conductor of the bus 61 and this disables the AND gate 327 through the inverter 331. In addition, the signal from the BSY flip-flop 315 enables a vector generator 332 to transmit data onto data conductors in the bus 61 for use by the CPU 60 in FIG. 3. Also, the signal from the BSY flip-flop 316 enables an AND gate 333. When the interruption has been completed and the data from the vector generator 332 has been received, an SSYN signal appears on a corresponding conductor in the bus 61. This energizes the AND gate 333. The resulting output resets the latch 314 and thereby conditions the GRANT flip-flop 320 to pass any subsequently received BG pulses.

The CPU 60 in FIG. 3 uses the data from the vector generator 332 as an address to a predetermined interruption routine. This routine will transmit to the controller remote register reading commands for the attention summary register 145, status register 141 and, if the ERR signal is active, the error register 142 (FIGS. 7 and 13).

1. Reading Attention Summary Register

Figure 16:
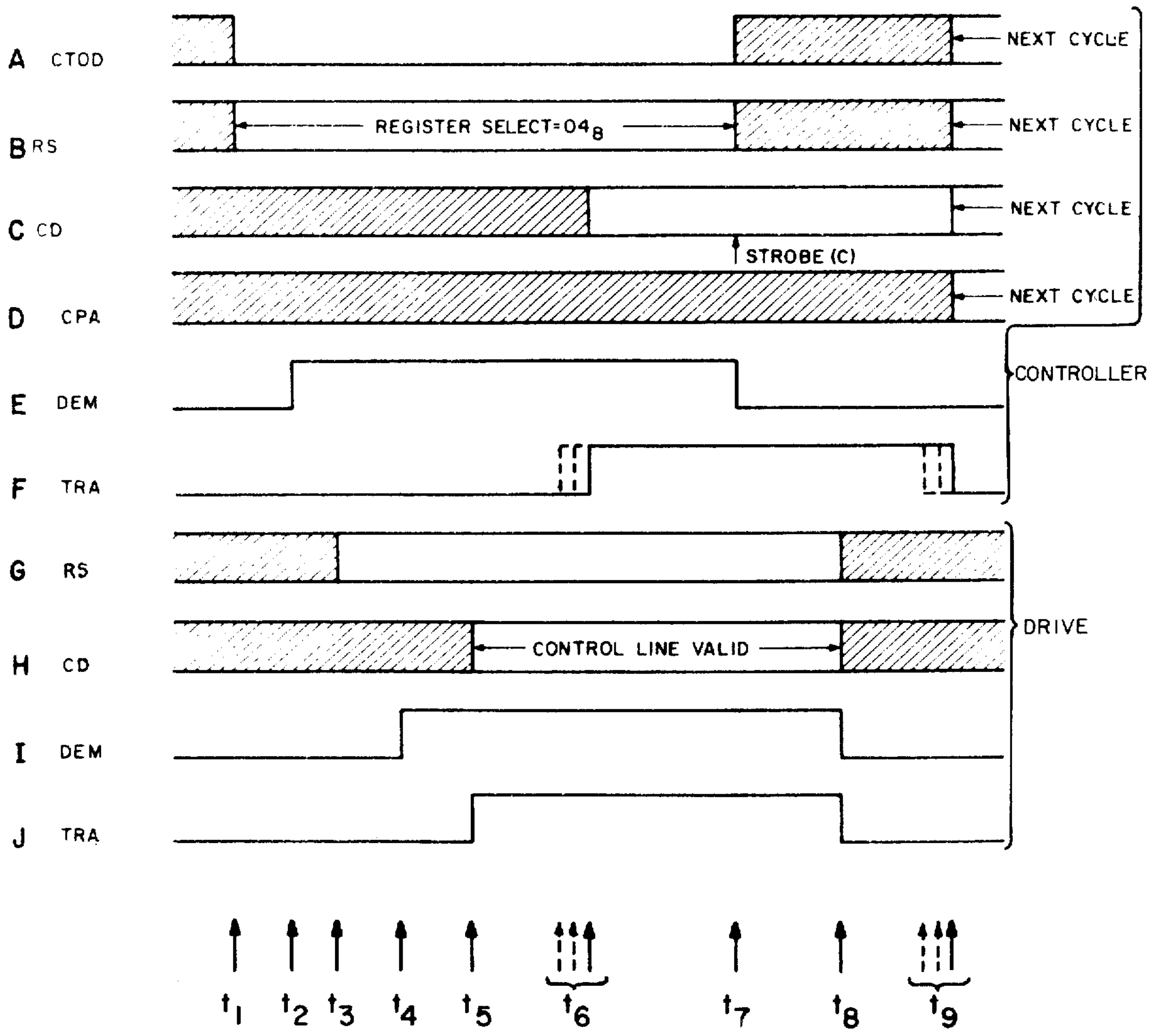
FIG. 16 includes timing charts for retrieving information from the circuit in FIG. 14.

When the controller receives a command to read the attention summary register 145, the circuits shown in FIG. 6 produce several signals which are transferred from the output drivers 161 onto the device bus 121 and specifically onto the control section 80. The CTOD signal is not asserted indicating that transfer is from the drive to the controller. As the status of all ATA flip-flops 300 is monitored, DS signals have no meaning. The selection is made by the RS signals. In this specific disclosure, the attention summary register is identified by RS signals with a value $04_8$. As shown in FIGS. 8 and 16, the CTOD and RS signals appear on the device bus 121 (FIG. 6) at time $t1$ (Charts 16A and B) and are represented by step 200. At time $t2$ the controller transmits the DEM signal (Step 202 and Chart 16E), Referring to FIG. 14, the RS and CTOD signals are received at time $t3$ and the DEM signal is received on the DEM wire 91 at time $t4$ (Charts 16G and 16I). The DEM signal passes into a delayed pulse generator 340 and produces an output signal in the form of a STROBE pulse coupled to a decoder 342. This decodes the RS signals received at time $t3$ in FIG. 16 and causes the operation to divert to step 205 in FIG. 8 for those drives which the DS signals do not designate.

Referring to FIG. 14, the two low order RS signals pass through inverters 343 and 344 into an AND gate 345 which also receives the other RS signal and, through an inverter 346, the CTOD signal. Whenever the AND gate 345 is energized, it produces an RD ATTN SUM signal.

Once the RD ATTN SUM signal is activated, the AND gate 350 is energized if the ATA flip-flop 300 in the drive is set. When the AND gate 350 is energized, a decoder 351 is enabled to clock a signal onto the CD wires 84. Both the decoder 342 and the decoder 351 receive DS SWITCH signals. These DS SWITCH signals are fixed for each drive and identify each drive with a number which uniquely identifies the drive with respect to other drives connected to the controller. Assuming, for example, the drives connected to any one controller are designated with numbers beginning with 0, the setting of the switches and the resulting DS SWITCH signals will cause the decoder 351 to produce a ONE signal onto a corresponding CD wire. Thus, the decoder 351 produces a ONE onto the 01 wire in the CD wires 84 if the DS SWITCH signals have a value 01 and the AND gate 350 is energized. These signals are placed onto the CD wires 84 at time t5 as shown in Graph 16.

Referring to FIG. 8, any time the RS signals have a value $04_8$ indicating the attention summary register 145 is to be read, the controller does not respond to TRA signals on the TRA wire 92 from the drives (Charts 17J and 17F) so step 220 diverts to step 221. The device bus control 160 in FIG. 6 gates in the data from the device bus 121 through the receivers 171 at time $t7$ (Chart 16C). Once this occurs, the controller in FIG. 6 negates the DEM signal as shown in step 214 (Chart 16E) and this enables the TRA signal on wire 92 to terminate. As previously indicated, the data is transmitted directly to the central processing unit or another unit in the data processing system over the system bus 120. As a result, the number which the data processing system receives indicates exactly which drives have produced the ATTN signal.

Referring again to FIG. 14, other drive conditions beside error conditions, cause a drive to produce the ATTN signal on the wire 94. For example, if the DRY and MOL signals indicate that the drive can accept a command and that the drive power is on, an AND gate 352 enables a monostable multivibrator 349 to produce a pulse which passes through an OR gate 353 to immediately set the ATA flip-flop 300. Alternatively, whenever an operation in response to a SEARCH command is in progress, the PIP signal is transmitted. An inverter 354 couples the PIP signal to a flip-flop 355 to set the flip-flop 355 when the PIP signal is deactivated. The resulting signal from the flip-flop 355 passes through the OR gate 353 to set the ATA flip-flop 300 and through a delay circuit 356 to reset the flip-flop 355.

After the central processor unit reads the attention summary register which comprises the ATA flip-flop in each drive, it can then perform remote reading operations with respect to each of the drives to determine the exact cause of the attention signal. Normally data in the status register 141 in each appropriate drive is retrieved. When this occurs, the incoming signals to the decoder 342 in FIG. 14 produce an RD ST signal which enables the status register 141 to couple the signals from all the stages shown in FIG. 13 onto the CD wires 84 for transfer back to the data processing system. If an analysis of status register 141, as shown in FIG. 13, shows that any condition other than the ERR conditions sets the ATA flip-flop 300, it is not necessary to read the error register 142. If the ERR signal is active, then the data processing system can perform another reading operation to ascertain the status of the error register 142. In that case, the decoder 342 produces an RD ERR signal which enables output gates 360 to couple the outputs of each of the stages in the error register 142 onto the CD wires 84. During these reading operations, the DS SWITCH signals applied to the decoder 342 are compared with DS signals on the conductors 86 in order to enable only the addressed drive to respond.

One of the advantages of this condition detection circuit is the manner in which the ATTN signals can be terminated. For example, if the output drivers 161 in FIG. 6 produce an INIT signal, the appearance of that signal on the conductor 95 shown in FIG. 14 causes an OR gate 361 (which also responds to a power signal POWER UP) to reset many flip-flops in the drive including the individual flip-flops which comprise the error register 142. In addition, the INIT signal passes through another OR gate 362 to reset the ATA flip-flop 300.

Any drive can be made to terminate its ATTN signal by loading a transfer command into the control register 140 with the GO bit position containing a ONE. When such an active transfer command is transferred, the RS signals have a value of 00, so inverters 363, 364, and 365 energize an AND gate 366. The CTOD signal on the wire 90 is asserted during a writing operation. When the DEM signal energizes an AND gate 367, the resulting signal passes through an OR gate 362 to reset the flip-flop 300.

Figure 17:
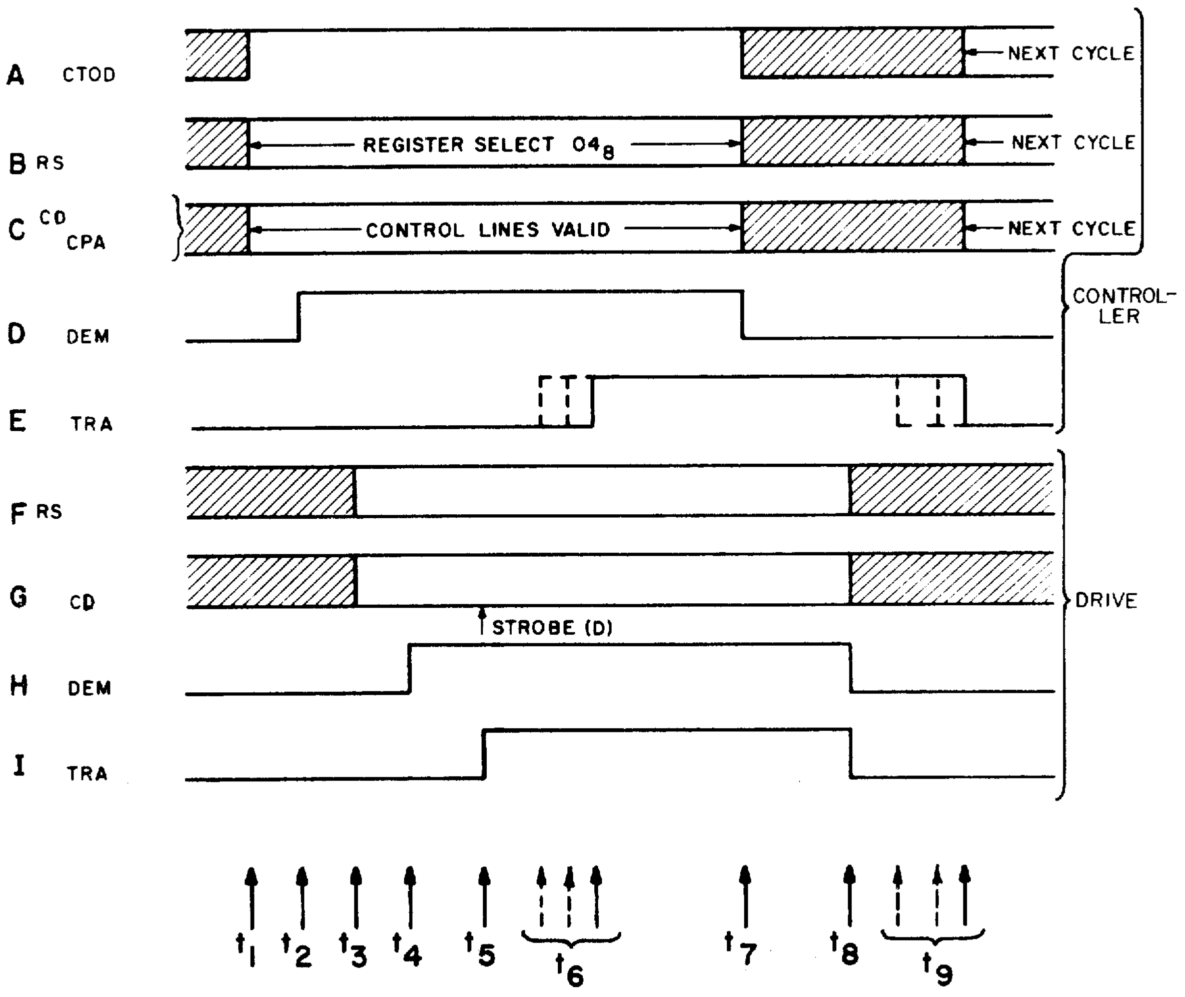
FIG. 17 includes timing charts for storing information in the circuit of FIG. 14.

Still another method of resetting the ATA flip-flop 300, is to alter the contents of the attention summary register. Any ATA flip-flop corresponding to a control data wire which transfers a ONE is thereby reset. This operation modifies the flow shown in FIG. 10 and timing in FIG. 17.

When the controller receives a command to alter the contents of the attention summary register 145 (FIG. 13) the output drivers 161 in FIG. 6 transmits RS to signals with a value $04_8$ and assert the CTOD signal on conductor 90. This occurs at time $t1$ (Charts 17A and 17B). At the same time, the drivers 182 couple data signals onto the CD wires 84 to identify those drives in which the ATA flip-flop 300 is to be reset (Chart 17C). At time $t2$, (Chart 17D) and step 228, the controller transmits the DEM signal onto the conductor 91.

In this case, the signals from the inverters 363 and 364 and the input signal to the inverter 365 provide three of five enabling signals to an AND gate 370. The CTOD signal is also received at time $t3$ by the AND gate 370. At time $t4$ (Chart 17H) the DEM signal is received on conductor 91 and energizes the AND gate 370 to enable a multiplexer 371. The decoder 371 also receives the DS SWITCH signals and the data signals from the CD wires 84. The DS SWITCH signals select a conductor in the CD wires 84 carrying an asserted (i.e., a ONE) signal. If the selected conductor is energized, the multiplexer 371 energizes the OR gate 362 and resets the ATA flip-flop.

Specifically, the signal from the NAND gate 370 causes the data to the strobed at time $t5$ (Chart 17G). These operations within the drive are shown as steps 232 and 233 in FIG. 10. No further operations occur although the delayed pulse generator 340 produces the TRA signal (Chart 17I). The controller however, does not respond to the receipt of the TRA signals at time t6 (Chart 17E) when the RS signals have a value 04. As shown in FIG. 10, step 245 diverts to step 242 to disable the CD signals at time $t7$ (Chart 17C). Then the DEM signal is terminated at time $t7$ (Chart 17D) and the writing operation is finished as in a normal remote register writing operation.

The foregoing description is related to a specific controller and drive configuration adapted to use with a specifically identified data processing system. It will be apparent that many modifications can be made to various circuits for use with a specifically identified data processing system. It will also be apparent that many modifications can be made to various circuits for generating the same or equivalent signals and equivalent timing sequences. However, the circuitry shown in FIG. 14 demonstrates how a controller constructed in accordance with this invention produces many advantages over prior systems. First, setting an ATA flip-flop 300 produces an attention signal on a single conductor 94 common to all drives. This is equivalent to similar signals in prior daisy-chain connection in that all drives produce a single signal on a common conductor. However, in accordance with another aspect of this invention, no polling operations are necessary even with a daisy-chain connection because the status of each ATA flip-flop 300 is read onto CD wires 84. These wires are also used for other purposes so they introduce no significant extra costs. The resulting data uniquely identifies each drive in which has produced an attention signal. Thus, the central processing unit can respond to the attention signal in the same manner as it would respond to an equivalent signal in a radial connection even though the drives are connected in a daisy-chain connection.

The different clearing procedures also offer advantages, especially to programmers. Any one procedure or combination of some or all of the procedures can be used. Even though the ATA flip-flop 300 is reset, the cause of the ATA signal can still be determined since none of the stages in the error register 142 or the sources of the ERR, PIP, MOL, or DRY signals are reset.

A typical example of the advantages of this condition detector circuit can be seen by referring to a specific example. Consider that a data transfer is occuring between drive 1 and the data processing system over the synchronous data path. Also assume that drive 2 had previously received a search command so that the PIP stage in the status register 141 is set. When the drive 2 reaches its designated position, it is important to recognize that fact immediately. Thus, in accordance with this invention, the PIP signal becomes inactive and sets the ATA flip-flop 300 to produce the ATTN signal on the conductor 94. The central processing unit reads the status register 141, determines that the PIP bit position is no longer set, and then clears the ATA bit position in drive 2 using a remote register operation. This produces minimum interference with the data transfer to or from drive 1.

Thus, in accordance with this invention, the condition detecting circuit provides a circuit which is compatible with both radial and daisy-chain connections and which eliminates any need for polling operations. Three specific ways of terminating an attention signal generated by that position detecting circuit have been described. The attention signal can be terminated without disturbing other stages and registers which contain information which may be necessary to service the interruption. This greatly simplifies a programmer's task, as he has much more flexibility in scheduling the response to these signals and can terminate the attention signal after recording units which have made requests for interruptions.

Therefore, it is the object of the appended claims to cover all such variations and modifications as covered in the true spirit and scope of this invention.

What we claim as new and desire to secure by Letters Patent of the United States is:

1. A drive including a first register and a second register, said drive being adapted for connection to a controller used in a secondary storage digital data facility including at least one drive and a bus interconnecting a drive and controller, the bus including address lines, data lines and control lines including an attention line common to all drives connected to the controller, and the controller including means for transmitting to a drive over the bus signals for retrieving the contents of said first register, signals for altering the contents of said first register, and signals for tranferring to said second register commands including active transfer commands, said drive additionally comprising:

A. means for transmitting an attention signal,

B. means for enabling the transmitting means in response to predetermined condition in said drive, C. means for coupling the attention signal onto the attention line in the bus, D. means responsive to signals from the controller for retrieving the contents of said first register for coupling the attention signal onto a predetermined corresponding data line, each drive connected to a controller coupling the attention signal onto a different predetermined data line to thereby effect a correspondence between each drive and a data line, and E. means for disabling said transmitting means including i. first clearing means responsive to signals from the controller for altering the contents of said first register in response to a signal on a predetermined corresponding data line, and ii. second clearing means responsive to signals from the controller corresponding to an active transfer command being transferred into said second register.

2. A drive as recited in claim 1 wherein said transmitting means includes a bistable circuit for transmitting the attention signal, said bistable circuit having set and reset conditions, said enabling means setting said bistable circuit and said disabling means resetting said bistable circuit.

3. A drive as recited in claim 2 wherein said drive additionally comprises A. means for transferring data over the bus in blocks, B. an error register for recording the occurrence of predetermined conditions during a transfer of data, and C. means for transmitting a termination signal after each block has been transferred, D. said enabling means including i. means connected to said error register to transmit an error signal in response to the occurrence of any predetermined error condition during a transfer, and ii. means responsive to the concurrence of the error signal and the termination signal for setting said bistable circuit and thereby transmitting the attention signal.

4. A drive as recited in claim 3 additionally comprising

A. a recording medium for storing data at identifiable locations,
B. means for searching for a specified data location in response to a search transfer command, and
C. means for transmitting a positioning signal during the searching operation,
D. said enabling means additionally comprising means responsive to the termination of the positioning signal for setting said bistable circuit.

5. A drive as recited in claim 3 wherein said drive includes
A. power supply means,
B. a moving medium for storing data,
C. means for transmitting power supply signals energized in response to the proper operation of said power supply means,
C. means for transmitting a speed signal energized when said medium reaches a proper speed,
E. said enabling means additionally including means responsive to the energizing of one of said power supply or speed signal transmitting means while the other of said transmitting means is energized.

6. A drive as recited in claim 2 wherein the controller includes means for transmitting an initialization signal, said disabling means in said drive additionally including means responsive to the receipt of the initialization signals for disabling said bistable circuit.

7. A drive as recited in claim 6 additionally comprising means for transmitting drive identification signals for uniquely identifying said drive in relation to others connected to the controller, said first clearing means including
i. selection means connected to the control and data lines for selecting the line corresponding to the drive in response to signals from said drive identification transmitting means, and
ii. means responsive to signals on the address and control lines when the controller transmits signals for altering the contents of said first register for enabling said selection means to transmit a signal from the corresponding data lines, said first clearing means being responsive to a first value of the signal for causing said disabling means to reset said bistable circuit.

8. A drive as recited in claim 6 wherein said drive comprises means for transmitting drive identification signals for uniquely identifying said drive in relation to others connected to the controller, said second clearing means including
i. decoder means responsive to signals on the data lines when said second register contains an active transfer command, and
ii. enabling means responsive to the signals on the address and control lines when the controller transmits the signals for transferring to said register commands for activating said decoder means, said decoder means causing said disabling means to reset said bistable circuit.

9. A drive as recited in claim 2 additionally comprising means for transmitting drive identification signals for uniquely identifying said drive in relation to others connected to the controller, said first register retrieving means including
i. means responsive to signals on the address and control lines when the controller transmits signals for retrieving the contents of said first register for transmitting a retrieval enabling signal, and
ii. means responsive to the correspondence of signals on the address lines corresponding to the drive selection signal for gating the output of said bistable circuit onto the corresponding data line in the bus.

10. A secondary storage facility for connection to a data processing system including a central processor unit, said secondary storage facility comprising a controller, at least one drive with first and second registers and interconnecting bus lines, data lines and control lines including an attention line common to all drives connected to said controller,
A. said controller connected for transmitting and receiving control, address and data signals to or from said data processing system, said controller including
i. means for transmitting signal to retrieve the contents of said first register in each drive,
ii. means for transmitting signals to alter the contents of said first drive register, and
iii. means for transmitting signals to transfer to said second register in each drive commands including active transfer commands, and
B. each of said drives additionally including
i. means for transmitting an attention signal,
ii. means for enabling said transmitting means in response to predetermined conditions in said drive,
iii. means for coupling the attention signal onto the attention line in said bus,
iv. means responsive to the signals from said controller for retrieving the contents of said first register for coupling the attention signal onto a predetermined corresponding data line, each drive connected to a controller coupling the attention signal onto a different predetermined data line to thereby effect a correspondence between each drive and a data line, and
v. means for disabling said transmitting means including first clearing means responsive to the signals from the controller for altering the contents of said first register in response to a signal on a predetermined corresponding data line and second clearing means responsive to signals from said controller corresponding to an active transfer command being tranferred into said second register.

11. A secondary storage facility as recited in claim 10 wherein said transmitting means in each drive includes a bistable circuit for transmitting the attention signal, said bistable circuit having set and reset conditions and said enabling means setting said bistable circuit and wherein said controller includes means for transmitting an initialization signal, said disabling means in each of said drives including means responsive to the receipt of the initialization signal for resetting said bistable circuit.

12. A secondary storage facility as recited in claim 11 wherein said controller includes means for transmitting drive selection signals onto said address lines which uniquely identify each drive connected thereto and means for transmitting register selection signals onto said address lines for identifying registers in a drive and each drive comprises means for transmitting drive identification signals, said first clearing means in each drive including
i. selection means connected to the control and data lines for selecting the data line corresponding to the drive in response to signals from said drive identification transmitting means, and ii. means responsive to signals to the register selection signals which identify said first register for enabling said selection means to transmit a signal onto the corresponding data line, said first clearing means being responsive to a first value of the signal for causing said disabling means to reset said bistable circuit.

13. A secondary storage facility as recited in claim 10 wherein each drive comprises means for transmitting drive identification signals for uniquely identifying the drive in relation to others connected to said controller and wherein said controller includes means for transmitting over the address lines drive selection signals for selecting a particular drive, said first register retrieving means in each drive including i. means responsive to the drive selection signals on the address lines and signals on the control lines when said controller transmits the signals for retrieving the contents of said first register for transmitting a retrieval enabling signal, and ii. means responsive to the correspondence of the drive selection signals on the address lines, the drive identification signals and the retrieving enabling signal for gating the output of said bistable circuit onto the corresponding data line in the bus.

* * * * *

UNITED STATES PATENT OFFICE

CERTIFICATE OF CORRECTION

Patent No. 3,911,400 Dated Oct. 7, 1975

Inventor(s) John V. Levy et al

It is certified that error appears in the above-identified patent and that said Letters Patent are hereby corrected as shown below:

Column 1, line 63, delete "daisy-chain and insert --"daisy-chain"
Column 2, line 9, add quotation marks around --daisy-chain--
line 60, after "certain" insert --unnecessary--
Column 4, line 7, "adatped" should be "adapted"
line 34, add quotation marks around --drive--
line 39, "megnetic" should be "magnetic"
line 49, add quotation marks around --interfaces--
line 60, add quotation marks around --single drive--
line 64, add quotation marks around --daisy-chain--
line 66, add quotation marks around --radial--
Column 5, line 1, add quotation marks around --dual controller-single drive--
line 25, after "necessary" insert a period --.--
line 32, after "diverse" insert --types--
line 49, delete "form" and insert --from--
Column 6, line 43, add quotation marks around --dual-port--
line 55, delete "of" and insert --or--
Column 7, line 15, after "discuss" insert --first--
line 28, after "commands" delete "which"
line 29, delete "control information includes commands"
Column 8, line 32, add quotation marks around--block--
line 35, add quotation marks around --block--
line 36, add quotation marks around --block--
line 38, add quotation marks around --sector--

UNITED STATES PATENT OFFICE

CERTIFICATE OF CORRECTION

Patent No. 3,911,400 Dated Oct. 7, 1975

Inventor(s) John V. Levy et al

It is certified that error appears in the above-identified patent and that said Letters Patent are hereby corrected as shown below:

Column 8, line 40, add quotation marks around --block--
line 57, delete "drvice" and insert --device--
Column 9, line 21, add quotation marks around --local--
line 38, add quotation marks around --remote--
Column 10, line 48, add quotation marks around --writing--
Column 11, line 22, add quotation marks around --conductor--
line 25, add quotation marks around--WCin--
line 29, add quotation marks around --WCout--
Column 12, line 15, delete "divice" and insert --device--
Column 13, line 59, delete "representing" and insert --represents--
Column 16, line 21, after "(INIT" insert a closed parenthesis --)--
Column 19, line 26, delete "Stage" and insert --stage--
line 3, add quotation marks around --last--
line 50, delete "duriing" and insert --during--
Column 22, line 37, add quotation marks around --knows--
Column 23, line 6, delete "date" and insert --data--
Column 25, line 5, add quotation marks around --0--
line 8, add quotation marks around --01--
line 9, add quotation marks around --01--
line 14, add quotation marks around --$04_8$--
Column 26, line 18, add quotation marks around --00--
line 33, add quotation marks around --$04_8$--
line 54, delete "the" (second occurrence) and insert --be--
line 60, add quotation marks around--04--

UNITED STATES PATENT OFFICE
CERTIFICATE OF CORRECTION

Patent No. 3,911,400 Dated Oct. 7, 1975

Inventor(s) John V. Levy et al

It is certified that error appears in the above-identified patent and that said Letters Patent are hereby corrected as shown below:

Column 27, line 21, delete "in"
Column 29, line 55, after "said" insert --second--
Column 30, line 16, delete "signal" and insert --signals--

Signed and Sealed this

*eighth* Day of *June 1976*

[SEAL]

*Attest:*

RUTH C. MASON
*Attesting Officer*

C. MARSHALL DANN
*Commissioner of Patents and Trademarks*